US010670697B2

(12) United States Patent
Yamazaki et al.

(10) Patent No.: US 10,670,697 B2
(45) Date of Patent: Jun. 2, 2020

(54) SIGNAL PROCESSING APPARATUS, SIGNAL PROCESSING METHOD, AND OBJECT DETECTION SYSTEM

(71) Applicant: SONY CORPORATION, Tokyo (JP)

(72) Inventors: Toshio Yamazaki, Tokyo (JP); Kenichi Kawasaki, Tokyo (JP); Ryo Sawai, Tokyo (JP); Shingo Tsurumi, Saitama (JP); Akihiko Kaino, Kanagawa (JP); Takuto Motoyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 15/761,195

(22) PCT Filed: Sep. 16, 2016

(86) PCT No.: PCT/JP2016/077398
§ 371 (c)(1),
(2) Date: Mar. 19, 2018

(87) PCT Pub. No.: WO2017/057042
PCT Pub. Date: Apr. 6, 2017

(65) Prior Publication Data
US 2018/0259621 A1    Sep. 13, 2018

(30) Foreign Application Priority Data
Sep. 30, 2015    (JP) .................... 2015-193357

(51) Int. Cl.
*G01S 7/40* (2006.01)
*G01S 13/93* (2020.01)
(Continued)

(52) U.S. Cl.
CPC ............... *G01S 7/40* (2013.01); *G01C 3/085* (2013.01); *G01S 13/867* (2013.01); *G01S 13/93* (2013.01);
(Continued)

(58) Field of Classification Search
CPC ........ G01S 7/40; G01S 13/867; G01S 13/931; G06T 7/85; G06T 2207/10012;
(Continued)

(56) References Cited

U.S. PATENT DOCUMENTS 7,777,669 B2 * 8/2010 Tokoro ................. G01S 13/867
342/70
8,983,130 B2 * 3/2015 Yasugi ................. G01S 13/867
382/103
(Continued)

FOREIGN PATENT DOCUMENTS

CN    104641564 A    5/2015
EP    1947475 A1 *  7/2008  ........... G01S 13/867
(Continued)

OTHER PUBLICATIONS

International Search Report & Written Opinion of PCT Application No. PCT/JP2016/077398, dated Nov. 15, 2016, 14 pages.

*Primary Examiner* — Timothy A Brainard
*Assistant Examiner* — Nuzhat Pervin
(74) *Attorney, Agent, or Firm* — Chip Law Group

(57) ABSTRACT

Provided are signal processing apparatus, a signal processing method, and an object detection system that enable an object detection to be accurately performed. A stereo camera performs imaging by a right camera and a left camera to acquire a stereo image. A millimeter wave radar acquires a radar image in which a position of an object is detected in a radiation range of millimeter waves based on millimeter waves. Further, by communication via a communication apparatus with a target of which positional information is known, it is determined whether or not the target is reliable, and in a case where it is determined that the target is reliable, calibration processing is performed for eliminating a devia-
(Continued)

tion in coordinate systems generated in the stereo image and the radar image in which the target is detected.

10 Claims, 17 Drawing Sheets

(51) Int. Cl.
| | |
|---|---|
| G06T 1/00 | (2006.01) |
| G06T 7/80 | (2017.01) |
| H04N 13/246 | (2018.01) |
| G01C 3/08 | (2006.01) |
| G01S 13/86 | (2006.01) |
| G01S 13/931 | (2020.01) |
| G06K 9/00 | (2006.01) |
| G06K 9/62 | (2006.01) |
| G08G 1/09 | (2006.01) |
| G08G 1/16 | (2006.01) |

(52) U.S. Cl.
CPC ........ *G01S 13/931* (2013.01); *G06K 9/00805* (2013.01); *G06K 9/6289* (2013.01); *G06T 1/00* (2013.01); *G06T 7/85* (2017.01); *H04N 13/246* (2018.05); *G06T 2207/10012* (2013.01); *G06T 2207/10044* (2013.01); *G06T 2207/30261* (2013.01); *G08G 1/09* (2013.01); *G08G 1/16* (2013.01)

(58) Field of Classification Search
CPC ........... G06T 2207/10044; G06T 2207/30261; H04N 13/246; G01C 3/085; G06K 9/00805; G06K 9/6289; G08G 1/16
USPC ......................................................... 342/55
See application file for complete search history.

(56) References Cited

U.S. PATENT DOCUMENTS

| | | | | |
|---|---|---|---|---|
| 9,671,493 B1 | * | 6/2017 | Khosla | .................. G01S 13/867 |
| 2009/0201192 A1 | * | 8/2009 | Tokoro | ................ B60R 21/0134 |
| | | | | 342/70 |
| 2010/0256940 A1 | * | 10/2010 | Ogawa | .................. G01S 7/4812 |
| | | | | 702/97 |
| 2011/0122257 A1 | * | 5/2011 | Kirk | ........................ G01C 11/06 |
| | | | | 348/187 |
| 2012/0218546 A1 | | 8/2012 | Ogawa et al. | |
| 2013/0148855 A1 | * | 6/2013 | Yasugi | .................. G01S 13/867 |
| | | | | 382/103 |
| 2015/0240459 A1 | * | 8/2015 | Kawasaki | ............... E02F 9/267 |
| | | | | 701/50 |
| 2016/0018260 A1 | * | 1/2016 | Samuels | ............. G01N 21/278 |
| | | | | 702/104 |

FOREIGN PATENT DOCUMENTS

| | | | | | |
|---|---|---|---|---|---|
| JP | 2007024590 A | * | 2/2007 | .......... | G01S 13/931 |
| JP | 2007-218738 A | | 8/2007 | | |
| JP | 2007218738 A | * | 8/2007 | ............ | G01S 13/86 |
| JP | 2008304344 A | * | 12/2008 | ............ | G01S 17/93 |
| JP | 2010-151682 A | | 7/2010 | | |
| JP | 2010151682 A | * | 7/2010 | ............ | G01S 17/89 |
| JP | 2011-216011 A | | 10/2011 | | |
| JP | 4918676 B2 | | 4/2012 | | |
| JP | 2012-147085 | | 8/2012 | | |
| JP | 2012-147085 A | | 8/2012 | | |
| JP | 5012270 B2 | * | 8/2012 | ............ | G01S 13/86 |
| JP | 5688876 B2 | | 3/2015 | | |
| JP | 5695271 B1 | | 4/2015 | | |
| JP | 5724389 B2 | | 5/2015 | | |
| KR | 10-2015-0068351 A | | 6/2015 | | |
| WO | WO-2007007906 A1 | * | 1/2007 | .......... | G01S 13/931 |
| WO | WO-2012101967 A1 | * | 8/2012 | ............ | G03B 35/08 |
| WO | 2014/159620 A1 | | 10/2014 | | |
| WO | WO-2014159620 A1 | * | 10/2014 | ........ | G01N 21/4785 |
| WO | 2015/040719 A1 | | 3/2015 | | |

* cited by examiner

FIG.8
KNOWN TARGET ARRANGEMENT INFORMATION
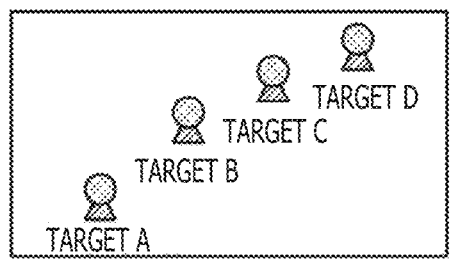
RADAR IMAGE
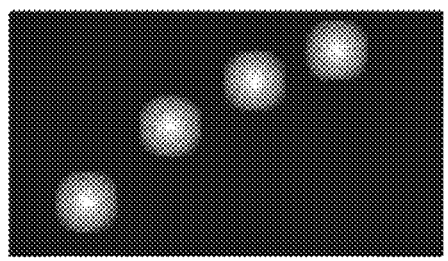
POSITIONING
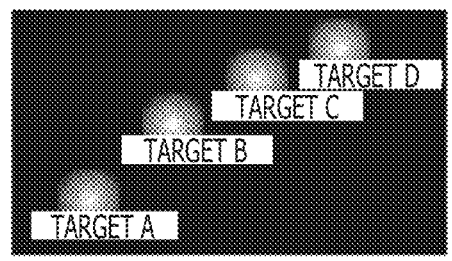
RADAR IMAGE IN WHICH TARGET IS SPECIFIED

SIGNAL PROCESSING APPARATUS, SIGNAL PROCESSING METHOD, AND OBJECT DETECTION SYSTEM

CROSS REFERENCE TO RELATED APPLICATIONS

This application is a U.S. National Phase of International Patent Application No. PCT/JP2016/077398 filed on Sep. 16, 2016, which claims priority benefit of Japanese Patent Application No. JP 2015-193357 filed in the Japan Patent Office on Sep. 30, 2015. Each of the above-referenced applications is hereby incorporated herein by reference in its entirety.

TECHNICAL FIELD

The present disclosure relates to a signal processing apparatus, a signal processing method, a program, and an object detection system, and in particular, to a signal processing apparatus, a signal processing method, a program, and an object detection system that enable an object detection to be accurately performed.

BACKGROUND ART

Recently, in vehicles of an automobile or the like, introduction of a collision avoidance system that detects the fore cars or pedestrians and automatically performs brake control or the like, and thereby avoids a collision advances.

For detection of objects such as the fore cars or pedestrians, image recognition of an image imaged by a stereo camera or radar information by a millimeter wave radar, a laser radar, or the like is used. Also, a development of an object detection system called a sensor fusion by using both a stereo camera and a radar progresses. In such an object detection system, it is necessary to accurately perform calibration of the stereo camera and the radar.

PTL 1, for example, discloses a technology for suppressing calibration in a place not suited to the calibration on the basis of vehicle traveling information and navigation information in an object detection apparatus that performs correction of a deviation in a detection direction axis of a radar device and an imaging device that detect the fore objects of a user vehicle as physical objects in accordance with a driving environment of the user vehicle.

CITATION LIST

Patent Literature

[PTL 1]
JP 2011-216011A

SUMMARY

Technical Problem

Meanwhile, by using a target located in a breakdown lane or the like to be used for calibration, it is possible to perform more accurate calibration; however, the target needs to be reliable. That is, the calibration is performed using the reliable target to thereby perform an object detection more accurately.

The present disclosure has been made in view of the circumstances as described above and aims at enabling the object detection to be accurately performed.

Solution to Problem

A signal processing apparatus according to an aspect of the present disclosure includes a reliability determination unit configured to determine, by communication with a target of which positional information is known, whether or not the target is reliable, and a calibration processing unit configured to perform calibration processing for eliminating a deviation in coordinate systems generated in a stereo image and a radar image in which the target is detected in a case where it is determined by the reliability determination unit that the target is reliable.

A signal processing method or a program according to an aspect of the present disclosure includes the steps of determining, by communication with a target of which positional information is known, whether or not the target is reliable, and performing calibration processing for eliminating a deviation in coordinate systems generated in a stereo image and a radar image in which the target is detected in a case where it is determined that the target is reliable.

An object detection system according to an aspect of the present disclosure includes a stereo image imaging apparatus configured to acquire a stereo image by performing imaging by a plurality of imaging units, a radar apparatus configured to acquire, by using a radio wave of a predetermined wavelength region, a radar image in which a position of an object in a radiation range of the radio wave is detected, a communication apparatus configured to perform communication with a target of which positional information is known, and a signal processing apparatus having a reliability determination unit configured to determine, by communication with the target via the communication apparatus, whether or not the target is reliable, and a calibration processing unit configured to perform calibration processing for eliminating a deviation in coordinate systems generated in the stereo image and the radar image in which the target is detected in a case where it is determined by the reliability determination unit that the target is reliable.

In accordance with an aspect of the present disclosure, it is determined, by communication with a target of which positional information is known, whether or not the target is reliable, and calibration processing is performed for eliminating a deviation in coordinate systems generated in a stereo image and a radar image in which the target is detected in a case where it is determined that the target is reliable.

Advantageous Effect of Invention

In accordance with an aspect of the present disclosure, an object detection can be accurately performed.

BRIEF DESCRIPTION OF DRAWINGS

FIG. 8 is a diagram illustrating a specification of the target in the radar image.

DESCRIPTION OF EMBODIMENTS

Hereinafter, specific embodiments to which the present technology is applied will be described in detail with reference to the accompanying drawings. In addition, the description is made in the following order.

1. Configuration Example of On-Vehicle Sensor
2. Configuration Example of Signal Processing Apparatus
3. Processing Flow of Calibration Processing
4. Correspondence Detection Processing
5. Calculation of Positional Relationship
6. Computer Configuration Example <1. Configuration Example of On-Vehicle Sensor>

Figure 1:
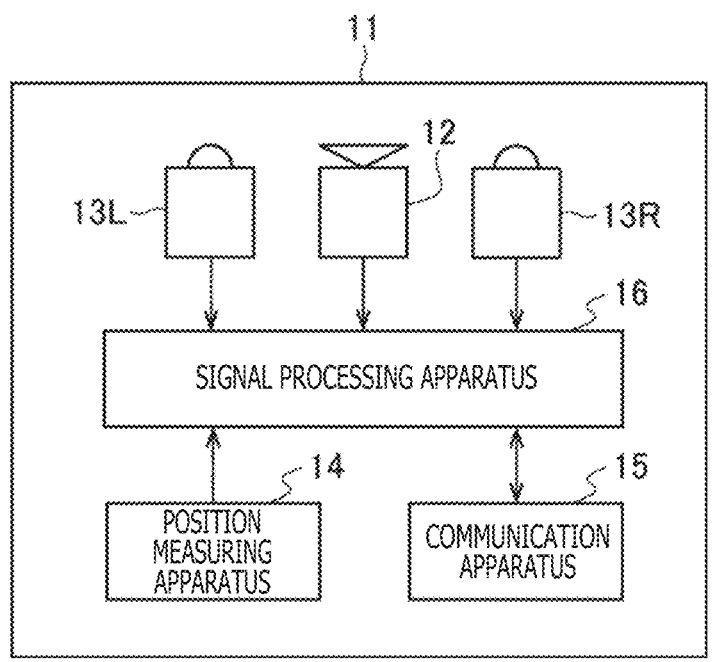
FIG. 1 is a block diagram illustrating a configuration example of an on-vehicle sensor into which a signal processing apparatus to which the present technology is applied is incorporated.

FIG. 1 is a block diagram illustrating a configuration example of an on-vehicle sensor (an object detection system) into which a signal processing apparatus to which the present technology is applied is incorporated.

As illustrated in FIG. 1, an on-vehicle sensor 11 includes a millimeter wave radar 12, a right camera 13R, a left camera 13L, a position measuring apparatus 14, a communication apparatus 15, and a signal processing apparatus 16.

The millimeter wave radar 12 can detect a position of an object that is present in a radiation range of a millimeter wave by using radio waves of a millimeter wave band (hereinafter, referred to as a millimeter wave). For example, the millimeter wave radar 12 applies a millimeter wave to the front of a traveling direction of a vehicle and supplies a radar image indicating a position of the defected object to the signal processing apparatus 16 with the traveling direction of the vehicle being set as a Z axis and a horizontal direction perpendicular to the traveling direction being set as an X axis.

The right camera 13R and the left camera 13L are arranged at the same height and spaced in a predetermined interval in a transverse direction, and images the front of the vehicle in the traveling direction. For example, a right camera image that is an image imaged by the right camera 13R and a left camera image that is an image imaged by the left camera 13L have images having a parallax (deviation in the transverse direction) due to differences of respective arrangement positions. Also, a positional relationship between the right camera 13R and the left camera 13L is accurately calibrated. In addition, hereinafter, appropriately, a combination of the right camera 13R and the left camera 13L is also referred to as a stereo camera 13 and, where the right camera image and the left camera image are not particularly sorted, the combination of the right camera 13R and the left camera 13L is also referred to as a stereo image.

The position measuring apparatus 14 uses a satellite navigation system such as a GPS (Global Positioning System) and receives radio waves from a satellite to thereby measure a current position, and supplies positional information obtained by the measurement to the signal processing apparatus 16. Also, on the basis of acceleration data or travel distance data, for example, the position measuring apparatus 14 matches a travel path on map data and thereby may measure the positional information.

The communication apparatus 15 can, for example, perform communication conforming to a Wi-Fi standard and performs communication with targets (the after-mentioned targets 22 illustrated in FIG. 3) including the after-mentioned communication function. Also, the communication apparatus 15 can perform communication through a mobile communication network used for communication by cellular phones and acquire a variety of information such as map data through a network such as the Internet.

On the basis of a radar image supplied from the millimeter wave radar 12 and a stereo image supplied from the stereo camera 13, the signal processing apparatus 16 performs signal processing for accurately specifying positions of objects such as vehicles projected on their images. For example, the object specified by the signal processing apparatus 16 is recognized as an obstacle to the traveling of vehicles, supplied to a vehicle brake system in a subsequent stage (not illustrated), and is used for automatic driving control or the like for avoiding a collision with that object. Also, where it is determined that the targets are reliable as described below, the signal processing apparatus 16 can perform calibration processing for adjusting a deviation between coordinate axes of the radar image and coordinate axes of the stereo image. In addition, a detailed configuration of the signal processing apparatus 16 will be described below with reference to FIG. 5.

Here, a correspondence relationship between the stereo image and the radar image will be described with reference to FIG. 2.

Figure 2:
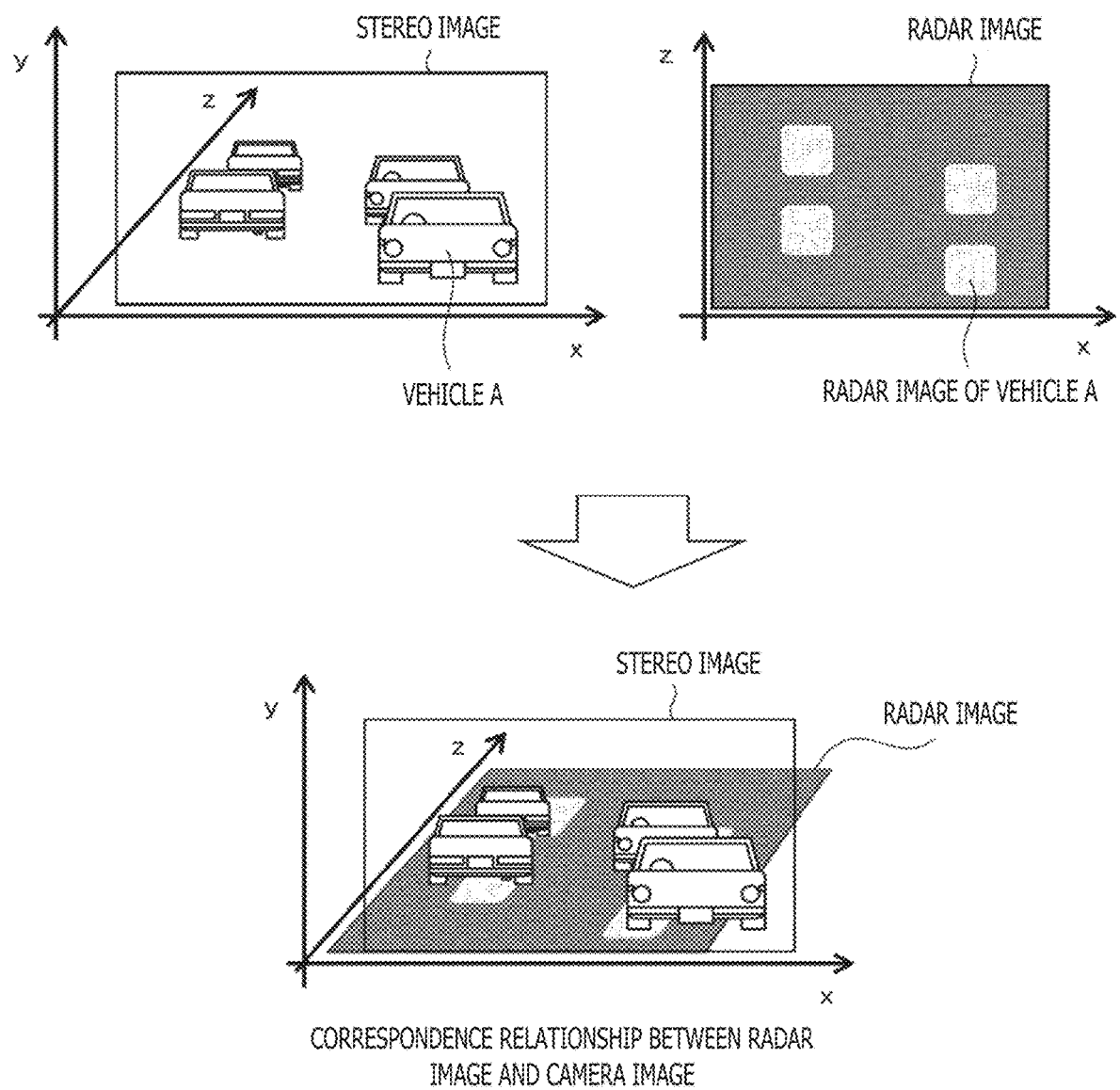
FIG. 2 is a diagram illustrating a correspondence relationship of a vehicle between a stereo image and a radar image.

In the on-vehicle sensor 11, for example, positions of vehicles projected on the stereo image imaged by the stereo camera 13 are specified on the basis of a coordinate system as illustrated in the upper left of FIG. 2. Specifically, in the stereo image of the stereo camera 13, the position of the vehicle is specified on the basis of the coordinate system in which the horizontal direction perpendicular to the traveling direction of the vehicle is set as an X axis, a vertical direction perpendicular to the traveling direction of the vehicle is set as a Y axis, and the traveling direction of the vehicle is set as a Z axis.

Also, in the on-vehicle sensor 11, the positions of the vehicles indicated in the radar image acquired by the millimeter wave radar 12 are specified on the basis of the coordinate system as illustrated in the upper right of FIG. 2. Specifically, in the radar image of the millimeter wave radar 12, the position of the vehicle is specified on the basis of the coordinate system in which the horizontal direction perpendicular to the traveling direction of the vehicle is set as an X axis and the traveling direction of the vehicle is set as a Z axis.

On the basis of such a coordinate system, the signal processing apparatus 16 can specify the position of the vehicle by using both the stereo image and the radar image, and, for example, a vehicle A projected on this part of the right side of the stereo image corresponds to a laser image indicated in the lower right of the radar image.

As illustrated in the lower side of FIG. 2, for example, when the stereo image and the radar image are supplied, the signal processing apparatus 16 maps the vehicles detected from their images to the coordinate system in a real space to thereby specify more accurate and more robust positions of the vehicles. Generally, the coordinate system of the stereo image and the coordinate system of the radar image are adjusted using a large system before shipping of the on-vehicle sensor 11 so as to be matched with the coordinate system in the real space. However, due to a secular change associated with the use of the on-vehicle sensor 11 or the like, possibly, deviation may be generated in their coordinate systems and the vehicle detected from the stereo image and the radar image cannot be accurately detected.

Accordingly, the on-vehicle sensor 11 needs to enable calibration processing for eliminating the deviation between the coordinate axis of the radar image and the coordinate system of the stereo image to be appropriately performed, the correspondence relationship between the respective detected objects to be matched with each other, and the objects to be accurately detected. Specifically, where the stereo camera 13 and the millimeter wave radar 12 individually detects the same vehicle, it is important to simply perform the adjustment to be mapped, as compared with the adjustment before shipping, so that the positions of the vehicles are matched with each other in the same position in the coordinate system in the real space.

Figure 3:
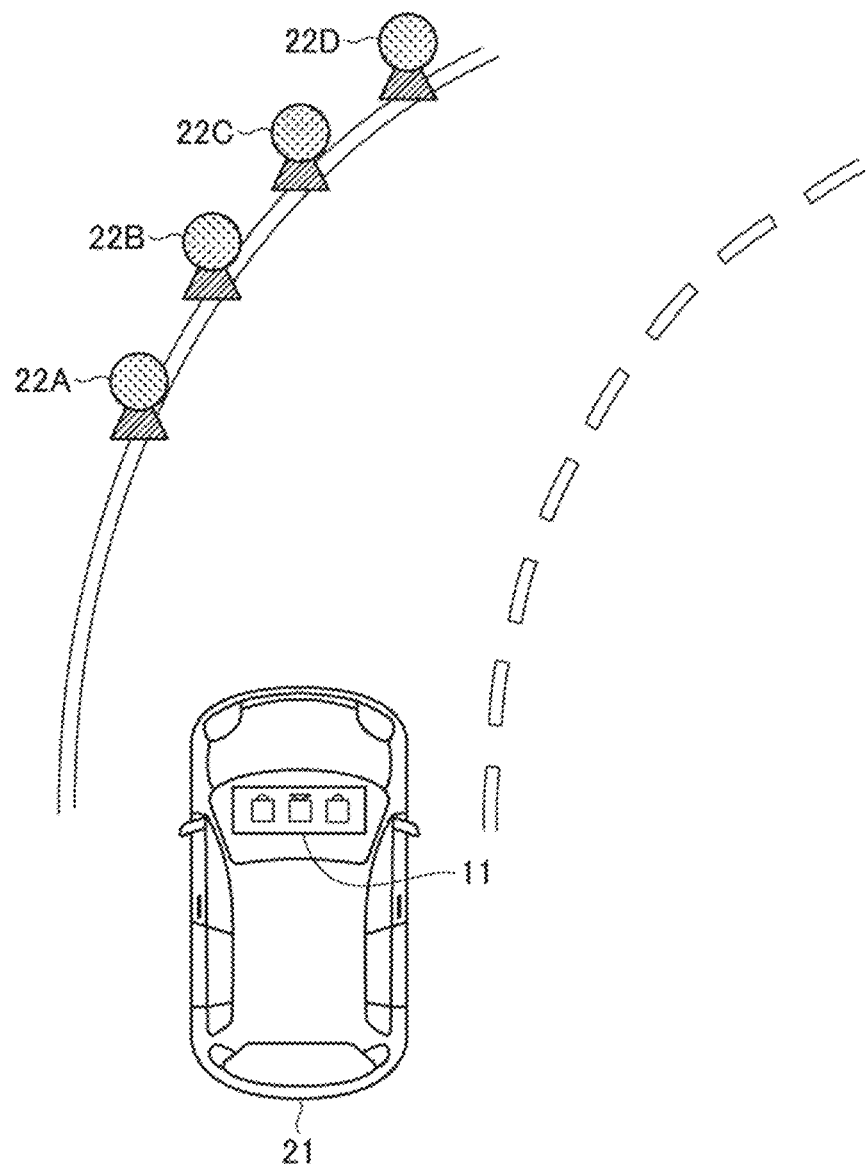
FIG. 3 is a diagram illustrating a positional relationship between the vehicle and a target.

In order to solve problems, for example, the on-vehicle sensor 11 can perform the calibration processing by using the targets as illustrated in FIG. 3.

In FIG. 3, the positional relationships between the vehicle 21 on which the on-vehicle sensor 11 is mounted and four targets 22A to 22D are illustrated.

As illustrated in FIG. 3, the on-vehicle sensor 11 is fixed inside a front glass of the vehicle 21, with the millimeter wave radar 12 and the stereo camera 13 facing toward a front face of the vehicle 21 so that objects before the vehicle 21 can be detected.

Also, the targets 22A to 22D are located in a breakdown lane at a predetermined height so as to be detected by the millimeter wave radar 12 and the stereo camera 13 of the on-vehicle sensor 11. For example, the targets 22A to 22D can be located at a known constant interval (or particularly encoded interval) like a reflecting plate provided on an upper end of a column support of the guard rail viewed from eyes. Also, a height at which the targets 22A to 22D are located is, for example, desirably set to be approximately one meter in which a calibration accuracy is best with the recognition of human beings paramount in thinking.

Then, when the positional relationships between the vehicle 21 and the targets 22A to 22D are as illustrated in FIG. 3, the on-vehicle sensor 11 acquires the stereo image and the radar image in the coordinate system in a similar manner in the above with reference to FIG. 2.

Figure 4:
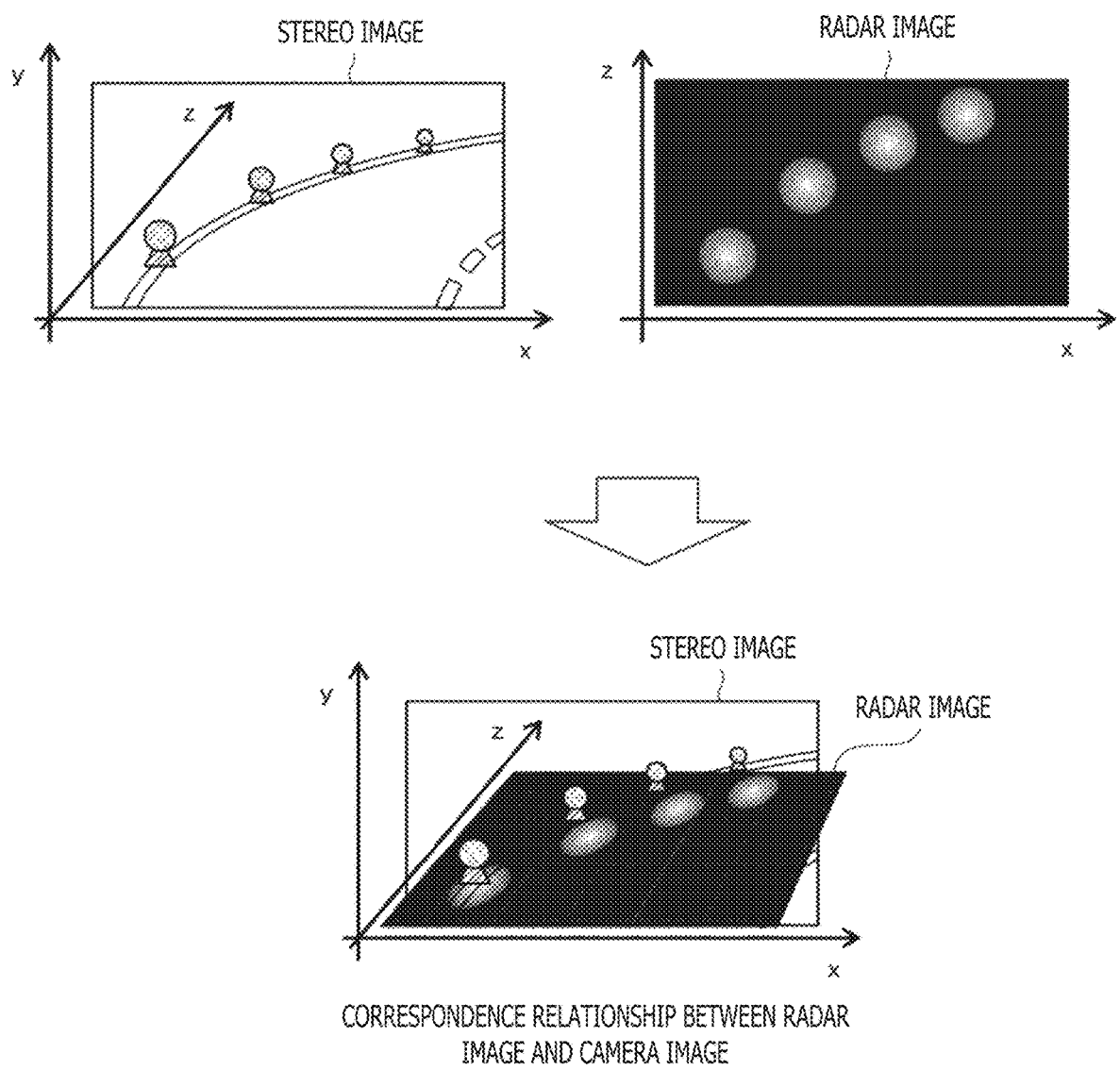
FIG. 4 is a diagram illustrating a correspondence relationship of the target between the stereo image and the radar image.

Specifically, as illustrated in an upper stage of FIG. 4, in the stereo camera 13, the targets 22A to 22D are detected in the coordinate system in which the horizontal direction perpendicular to the traveling direction of the vehicle is set as an X axis, the vertical direction perpendicular to the traveling direction of the vehicle is set as a Y axis, and the traveling direction of the vehicle is set as a Z axis. Also, in the millimeter wave radar 12, the targets 22A to 22D are detected in the coordinate system in which the horizontal direction perpendicular to the traveling direction of the vehicle is set as an X axis and the traveling direction of the vehicle is set as a Z axis.

Then, as illustrated in the lower side of FIG. 4, the signal processing apparatus 16 maps the targets 22A to 22D detected from the stereo image and the targets 22A to 22D detected from the radar image to the coordinate system in the real space.

At this time, where the deviation is generated in the positions of the targets 22A to 22D detected from the stereo image and the radar image, the signal processing apparatus 16 performs the calibration for eliminating the deviation. For example, the positional information of the targets 22A to 22D is assumed to be known in accordance with the coordinate system in the real space, and the signal processing apparatus 16 can refer to the map data on which the positional information is registered. Then, the signal processing apparatus 16 rotates or translates the coordinate system of the stereo image and the radar image and thereby performs the calibration so that the deviation between the positions of the detected targets and the known positions of the targets 22A to 22D is minimized.

Meanwhile, there is concern that the targets 22A to 22D are located in a public place such as the breakdown lane and thereby reliability that the objects detected by the stereo image and the radar image is really those registered on the map data is low. That is, in order to accurately perform the calibration processing, the reliability of the targets 22A to 22D needs to be secured.

In order to solve problems, where it is determined that the targets 22A to 22D are reliable, the signal processing apparatus 16 is configured so that the calibration processing can be performed. Hereinafter, appropriately, where each of the targets 22A to 22D does not need to be sorted, they are simply referred to as the targets 22.

<2. Configuration Example of Signal Processing Apparatus>

Figure 5:
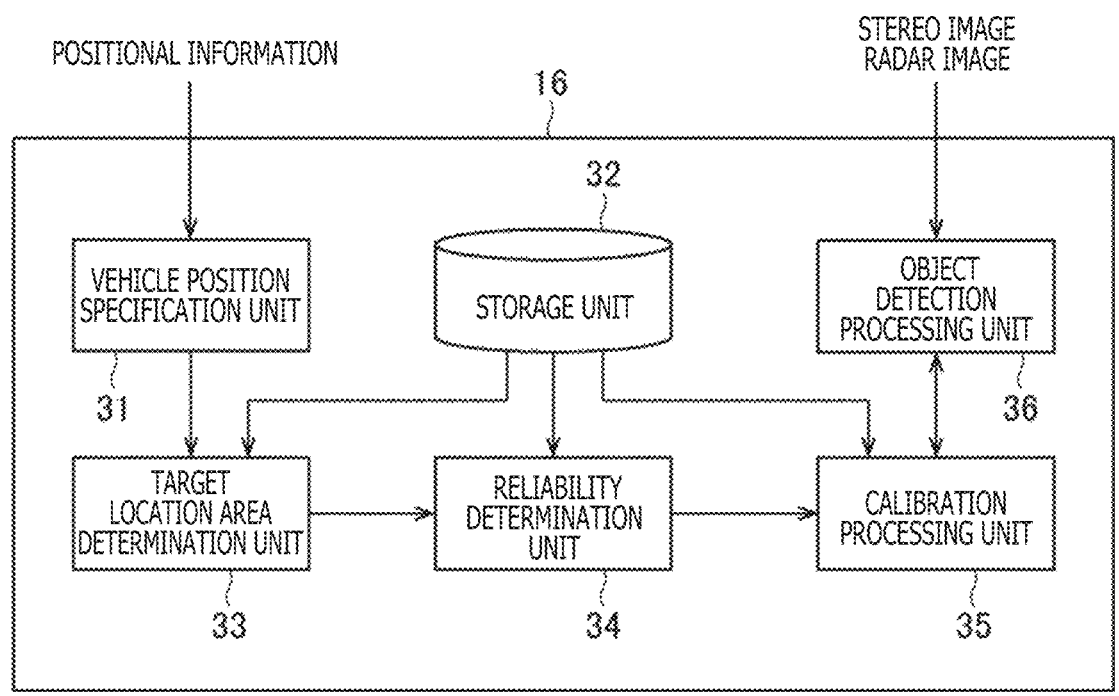
FIG. 5 is a block diagram illustrating a configuration example of the signal processing apparatus.

FIG. 5 is a block diagram illustrating a configuration example of the signal processing apparatus 16.

As illustrated in FIG. 5, the signal processing apparatus 16 includes a vehicle position specification unit 31, a storage unit 32, a target location area determination unit 33, a reliability determination unit 34, a calibration processing unit 35, and an object detection processing unit 36.

The vehicle position specification unit 31 specifies a position of the vehicle 21 (hereinafter, appropriately referred to as a vehicle position) in accordance with the positional information supplied from the position measuring apparatus 14 of FIG. 1, and supplies the vehicle position of the vehicle 21 to the target location area determination unit 33.

The storage unit 32 stores the map data on which arrangement information indicating positions in which the targets 22 are located is registered. For example, this map data can be acquired or updated through a network such as the Internet by communication of the communication apparatus 15 of FIG. 1.

On the basis of the vehicle position of the vehicle 21 supplied from the vehicle position specification unit 31, the target location area determination unit 33 acquires a location position of the target 22 nearest to the vehicle position from the map data of the storage unit 32. Then, the target location area determination unit 33 determines whether the vehicle position of the vehicle 21 is present in the location area in a predetermined range with a central focus on the location position of the target 22. In a case where it is determined that the vehicle position of the vehicle 21 is present in the location area of the target 22, the target location area determination unit 33 supplies the determination result to the reliability determination unit 34 and allows the reliability determination unit 34 to determine the reliability.

By communication with the targets 22 via the communication apparatus 15 of FIG. 1, for example, the reliability determination unit 34 can request digital signatures from the targets 22 and determine the reliability of the targets 22 by using the digital signatures transmitted from the targets 22.

In a case where it is determined by the reliability determination unit 34 that the targets 22 are reliable, the calibration processing unit 35 performs the calibration processing for eliminating the deviation in the coordinate systems generated in the stereo image and the radar image in which the targets 22 are detected. In addition, the calibration processing by the calibration processing unit 35 will be described below with reference to FIG. 7 to FIG. 9.

In accordance with the coordinate system to which the calibration by the calibration processing unit 35 is applied, the object detection processing unit 36 performs detection of objects that are present before the vehicle 21 on the basis of the stereo image and the radar image.

In the signal processing apparatus 16 configured above, the calibration of the stereo image and the radar image is performed by using the targets 22 that are determined to be reliable by the reliability determination unit 34 to thereby perform the calibration more accurately. This processing permits the object detection processing unit 36 to accurately perform the object detection in accordance with the coordinate system to which the calibration is applied. Also, where it is determined by the target location area determination unit 33 that the vehicle position of the vehicle 21 is present in the location area of the targets 22, the determination of the reliability is performed by the reliability determination unit 34 to thereby perform determination processing more appropriately.

Figure 6:
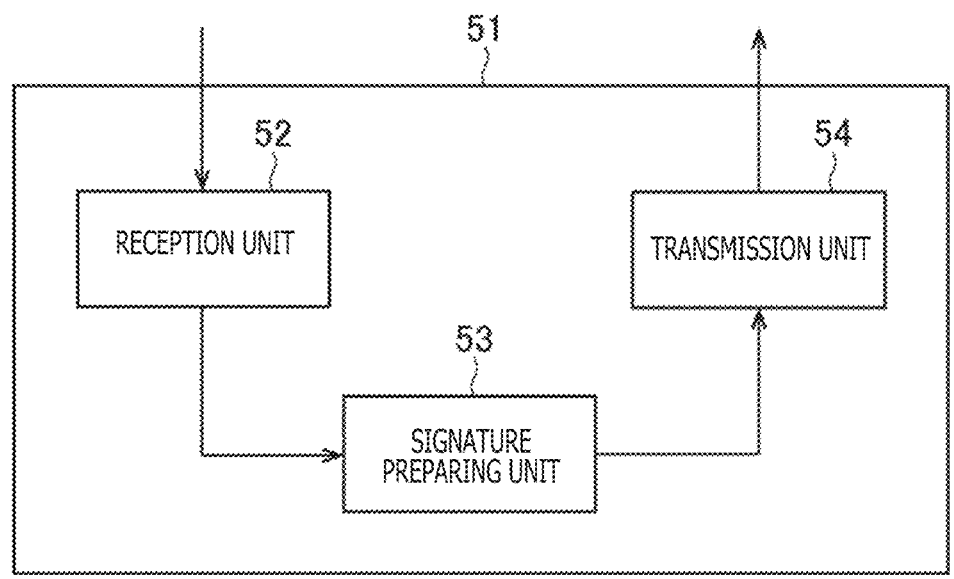
FIG. 6 is a block diagram illustrating a configuration example of a signal processing apparatus included in the target.

FIG. 6 is a block diagram illustrating a configuration example of a signal processing apparatus included in the targets 22.

As illustrated in FIG. 6, the signal processing apparatus 51 includes a reception unit 52, a signature preparing unit 53, and a transmission unit 54. Also, similarly to the communication apparatus 15 of the on-vehicle sensor 11, the targets 22 each include, for example, a communication apparatus (not illustrated) that performs communication conforming to the Wi-Fi standard.

When the signature request is received by communication with the signal processing apparatus 51, the reception unit 52 notifies the signature preparing unit 53 that the digital signature is requested.

For example, the signature preparing unit 53 calculates a hash value of predetermined data by a hash function and encrypts the hash value by a secret key of the signal processing apparatus 51. Then, the signature preparing unit 53 supplies, as the digital signature, the predetermined data and the encrypted hash value to the transmission unit 54.

The transmission unit 54 transmits the digital signature (the predetermined data and the encrypted hash value) prepared in the signature preparing unit 53 via the communication apparatus to the signal processing apparatus 51.

In this way, the signal processing apparatuses 51 of the targets 22 can transmit the digital signatures in accordance with the signature request from the signal processing apparatus 16.

Then, in the signal processing apparatus 16, by a public key of the signal processing apparatus 51, the reliability determination unit 34 decrypts the encrypted hash values transmitted from the targets 22 as the digital signatures. Also, the reliability determination unit 34 calculates, by the hash function, the hash value with relation to the predetermined data transmitted with the encrypted hash value. Then, the reliability determination unit 34 compares the hash values decrypted by the public keys with the hash values calculated from the predetermined data and, where they are matched with each other, determines that the targets 22 are reliable. In addition, the public key of the signal processing apparatus 51 is, for example, registered on the map data stored in the storage unit 32 with the positional information of the targets 22.

In this way, in the signal processing apparatus 16, where it is determined by the digital signatures that the targets 22 are reliable, the calibration processing by the calibration processing unit 35 is performed.

Here, the calibration processing by the calibration processing unit 35 will be described with reference to FIG. 7 to FIG. 9.

For example, the vehicle 21 and the targets 22A to 22D are present in the positional relationship as illustrated in FIG. 3 described above, and when it is determined by the reliability determination unit 34 that the targets 22A to 22D are reliable, the calibration processing unit 35 acquires the stereo image and the radar image via the object detection processing unit 36.

Figure 7:
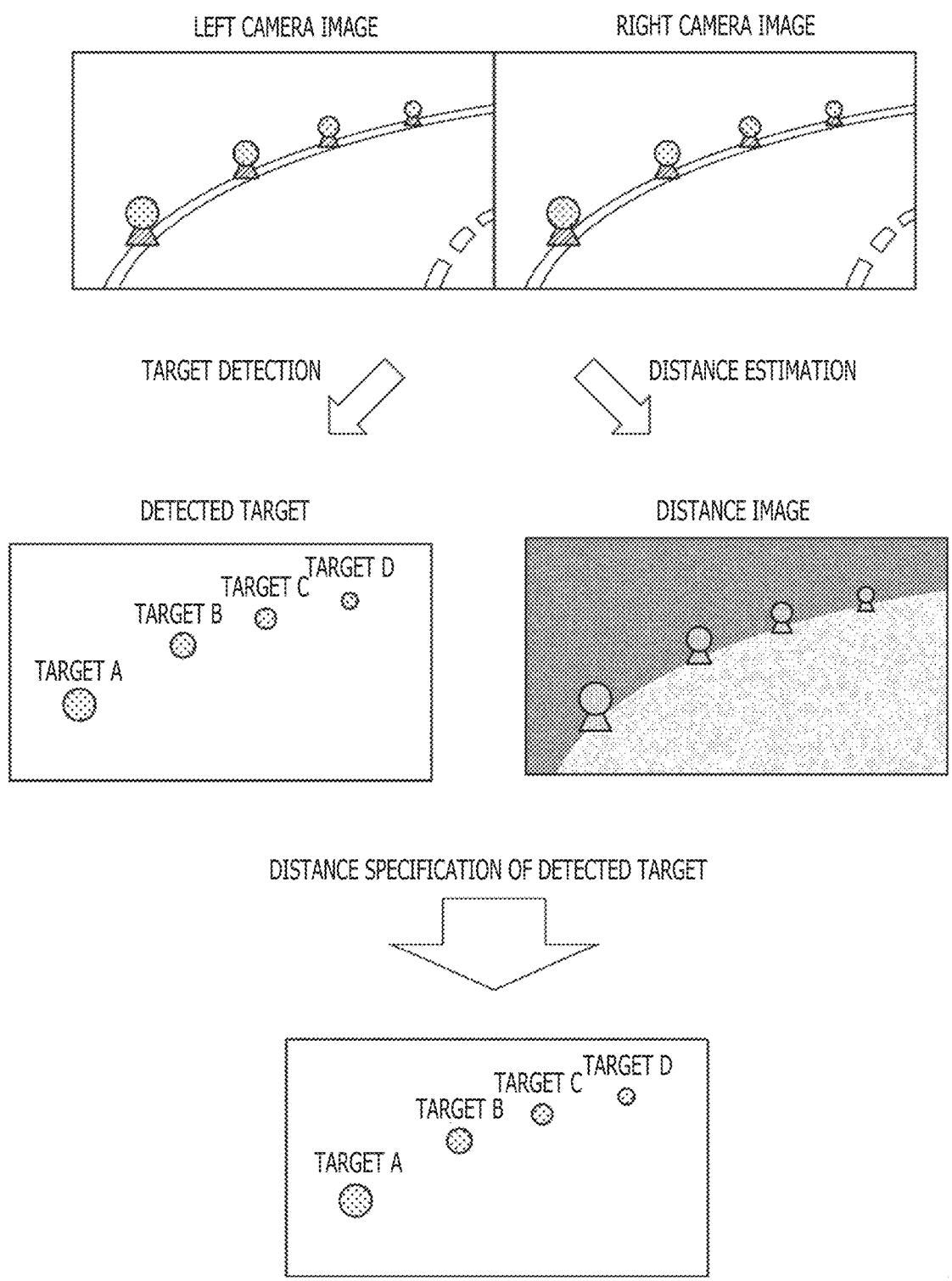
FIG. 7 is a diagram illustrating a specification of the target in the stereo image.

At this time, to the calibration processing unit 35, the stereo image (the right camera image and the left camera image) as illustrated in an upper stage of FIG. 7 is supplied. Here, each of the targets 22A to 22D is configured so as to be identified, by a two-dimensional code etc. stuck on the targets 22A to 22D themselves.

Accordingly, the calibration processing unit 35 performs image recognition for the stereo image and recognizes the two-dimensional code to thereby detect the targets 22A to 22D individually. Specifically, as illustrated in the left side of a middle stage of FIG. 7, the calibration processing unit 35 can identify each of the targets 22A to 22D.

Also, the calibration processing unit 35 can estimate a distance up to a projected object on the basis of the parallax of the right camera image and the left camera image and acquire a distance image displayed by the estimated distance as illustrated in the right side of the middle stage of FIG. 7.

Then, the calibration processing unit 35 performs AND (operates a logical product) between an image obtained by detecting the targets 22A to 22D individually and the distance image to thereby specify a distance up to each of the targets 22A to 22D. Also, the calibration processing unit 35 can specify an average or a median of the individually detected distance images in portions corresponding to the targets 22A to 22D as a distance up to each of the targets 22A to 22D.

Also, at this time, to the calibration processing unit 35, the radar image as illustrated in the right side of an upper stage of FIG. 8 is supplied. Then, the calibration processing unit 35 reads out the arrangement information of the targets 22A to 22D from the storage unit 32.

Accordingly, the calibration processing unit 35 performs positioning (correspondence detection processing) between the targets 22A to 22D projected on the radar image and the arrangement information of the targets 22A to 22D to thereby specify each of the targets 22A to 22D as illustrated in a lower stage of FIG. 8.

Figure 9:
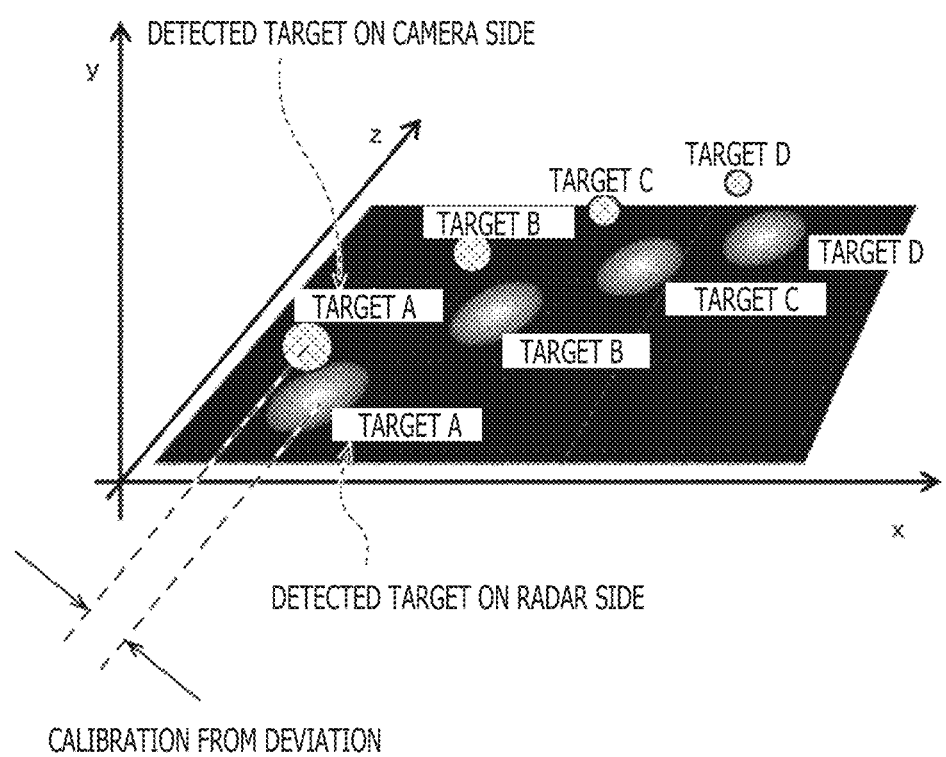
FIG. 9 is a diagram illustrating calibration using the target.

Then, as illustrated in FIG. 9, the calibration processing unit 35 maps the targets 22A to 22D detected from the stereo image and the targets 22A to 22D detected from the radar image to the coordinate system in the real space.

Further, the calibration processing unit 35 rotates or translates the coordinate system of the stereo image so as to minimize the deviation between the targets 22A to 22D detected from the stereo image and the targets 22A to 22D based on the positional information acquired from the map data. This processing permits the calibration processing unit 35 to perform the calibration in the coordinate system of the stereo image.

Similarly, the calibration processing unit 35 rotates or translates the coordinate system of the radar image so as to minimize the deviation between the targets 22A to 22D detected from the radar image and the targets 22A to 22D based on the positional information acquired from the map data. This processing permits the calibration processing unit 35 to perform the calibration in the coordinate system of the radar image.

In this way, the calibration processing unit 35 performs the calibration so that the coordinate system of the stereo image and the coordinate system of the radar image are matched with the coordinate system in the real space (the error is minimized) to thereby match a position of the object detected from the stereo image and a position of the object detected from the radar image.

<3. Processing Flow of Calibration Processing>

Signal processing performed in the signal processing apparatus 16 will be described with reference to FIG. 10 to FIG. 12.

For example, the signal processing apparatus 16 is set so as to regularly perform the signal processing (for example, in each fixed time or in each certain travel distance). In step S11, the vehicle position specification unit 31 acquires the positional information from the position measuring apparatus 14, specifies the vehicle position of the vehicle 21, and supplies the vehicle position of the vehicle 21 to the target location area determination unit 33.

In step S12, the target location area determination unit 33 acquires the location position of the target 22 nearest to the vehicle position from the map data of the storage unit 32 on the basis of the vehicle position of the vehicle 21 supplied in step S11.

In step S13, on the basis of the location position of the target 22 acquired in step S12, the target location area determination unit 33 determines whether or not the vehicle position of the vehicle 21 is present in the location area of the target 22. Then, where the target location area determination unit 33 determines that the vehicle position of the vehicle 21 is not present in the location area of the target 22, the signal processing ends. On the other hand, where the target location area determination unit 33 determines that the vehicle position of the vehicle 21 is present in the location area of the target 22, the processing proceeds to step S14.

In step S14, the reliability determination unit 34 performs target reliability determination processing as described with reference to FIG. 11.

In step S15, in accordance with the processing result of the target reliability determination processing, the reliability determination unit 34 determines whether or not all the targets 22 in the location area are reliable. Then, where the reliability determination unit 34 determines that all the targets 22 in the location area are not reliable (that is, even one target 22 that is not reliable is present), the signal processing ends. On the other hand, where the reliability determination unit 34 determines that all the targets 22 in the location area are reliable, the processing proceeds to step S16.

In step S16, the calibration processing unit 35 performs the calibration processing as described with reference to FIG. 12, and then the signal processing ends.

Figure 10:
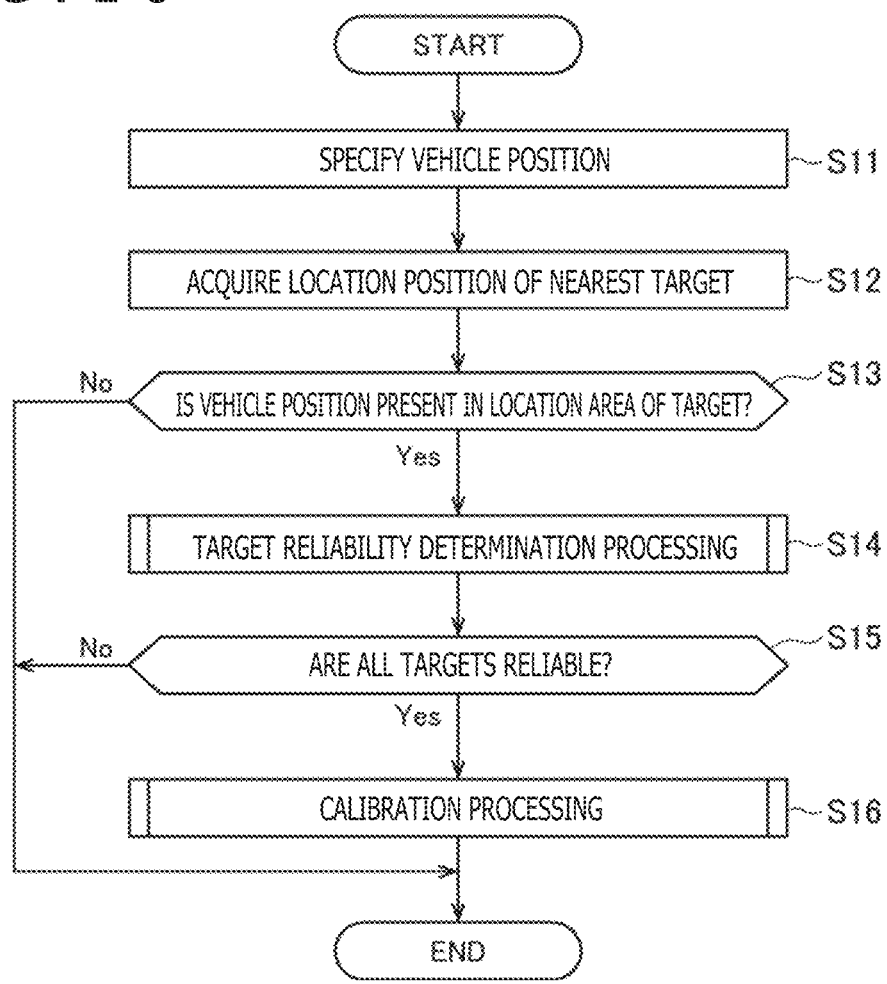
FIG. 10 is a flowchart illustrating signal processing.
Figure 11:
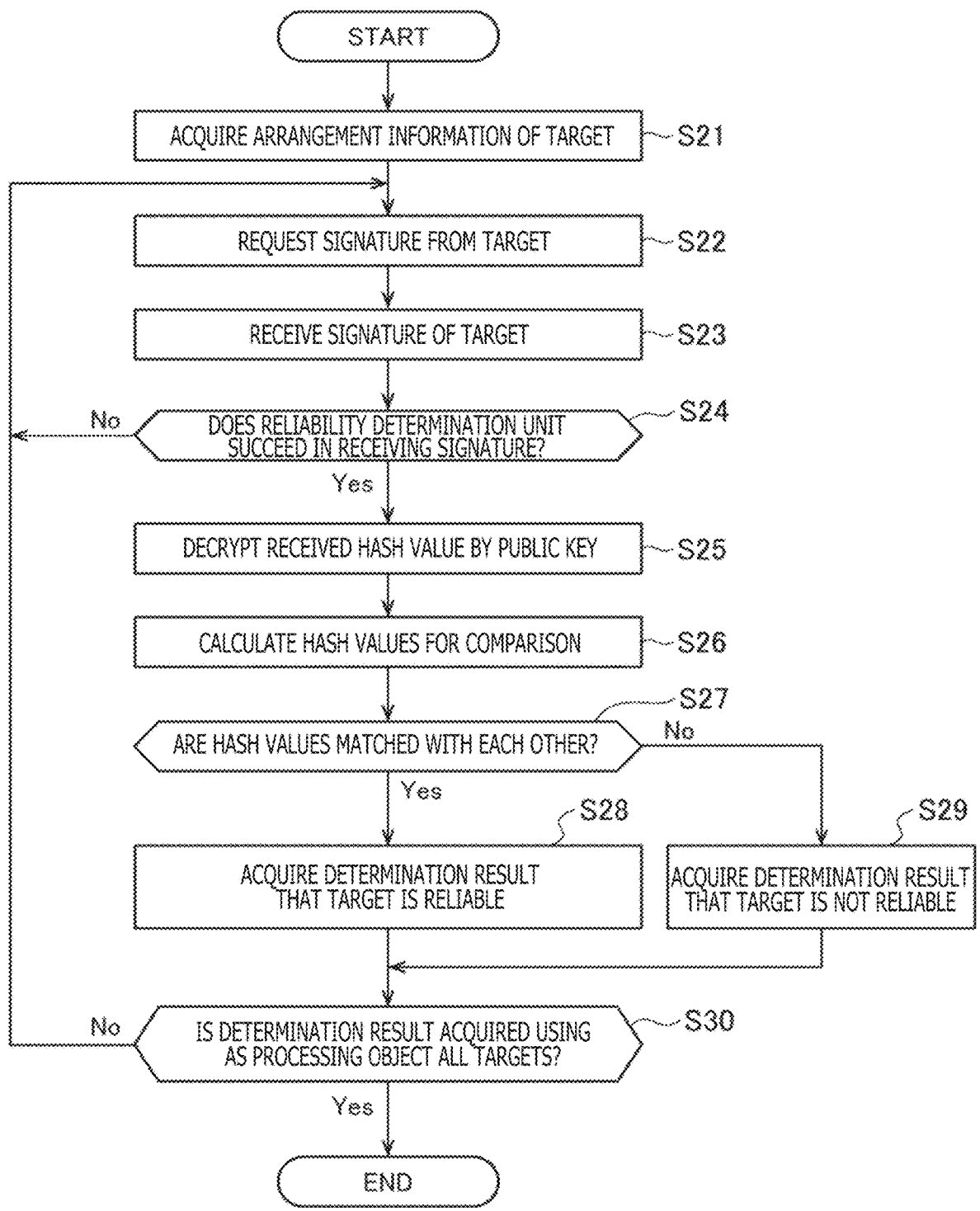
FIG. 11 is a flowchart illustrating target reliability determination processing.

Next, FIG. 11 is a flowchart describing the target reliability determination processing performed in step S14 of FIG. 10.

In step S21, on the basis of the vehicle position and the traveling direction of the vehicle 21, the reliability determination unit 34 reads out and acquires the arrangement information of the targets 22 estimated to be detected by the stereo image and the radar image from the map data stored in the storage unit 32. For example, on the map data, the reliability determination unit 34 acquires the arrangement information of the targets 22 before the vehicle 21 in the radiation range of the millimeter wave.

In step S22, from the communication apparatus 15, the reliability determination unit 34 requests, as an object of the processing in a predetermined order, signatures of the targets 22 in which the arrangement information is acquired in step S21, and the communication apparatus 15 transmits the signature requests to the targets 22. In accordance with the above, as described above with reference to FIG. 6, the signal processing apparatuses 51 of the targets 22 transmit the digital signatures in accordance with the signature request from the signal processing apparatus 16.

In step S23, the reliability determination unit 34 receives the digital signatures (the predetermined data and the encrypted hash values) transmitted from the targets 22 via the communication apparatus 15.

In step S24, the reliability determination unit 34 determines whether or not the reliability determination unit 34 succeeds in receiving the digital signatures in step S23 and, where it is determined that the reliability determination unit 34 does not succeed in receiving the digital signatures, the processing returns to step S22 and the transmission of the signature request is repeatedly performed. On the other hand, in step S24, where the reliability determination unit 34 determines that the reliability determination unit 34 succeeds in receiving the digital signatures, the processing proceeds to step S25.

In step S25, the reliability determination unit 34 decrypts the encrypted hash values transmitted from the targets 22 as the digital signature by the public key of the signal processing apparatus 51.

In step S26, the reliability determination unit 34 calculates, by the hash function, the hash values with relation to the predetermined data transmitted with the encrypted hash values. Then, the reliability determination unit 34 compares the hash values decrypted by the public keys with the hash values calculated from the predetermined data.

In step S27, as a result of the comparison in step S26, the reliability determination unit 34 determines whether or not the hash values are matched with each other.

In step S27, where the reliability determination unit 34 determines that the hash values are matched with each other, the processing proceeds to step S28. Then, the reliability determination unit 34 acquires the determination result that the targets 22 to be processed are reliable.

On the other hand, in step S27, where the reliability determination unit 34 determines that the hash values are not matched with each other, the processing proceeds to step S29. Then, the reliability determination unit 34 acquires the determination result that the targets 22 to be processed are not reliable.

After the processing of step S28 or S29, the processing proceeds to step S30 and the reliability determination unit 34 determines whether or not the determination results are acquired using, as the processing object, all the targets 22 in which the arrangement information is acquired in step S21.

In step S30, where the reliability determination unit 34 determines that the determination results are not acquired using as the processing object all the targets 22, the processing returns to step S22 and a similar processing is hereinafter repeated using, as the processing target, the next target 22 in which the determination result is not yet acquired. On the other hand, in step S30, where the reliability determination unit 34 determines that the determination result is acquired using as the processing object all the targets 22, the target reliability determination processing ends.

Figure 12:
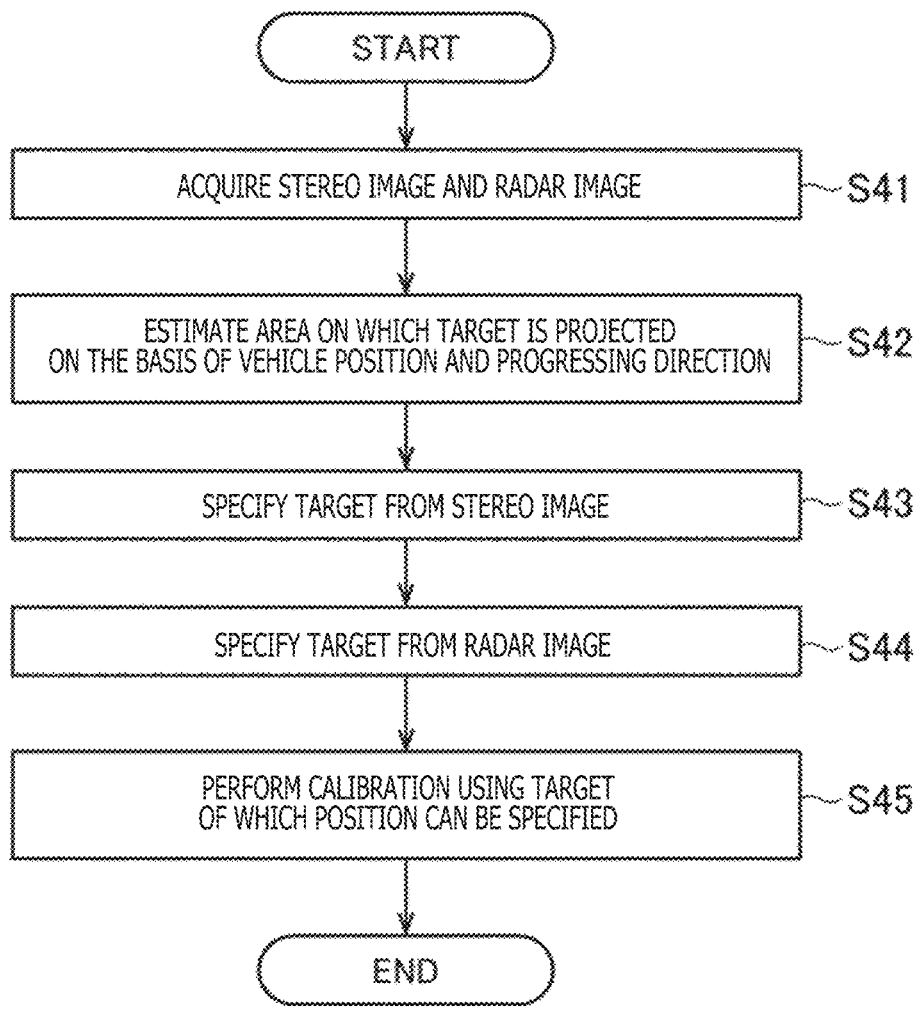
FIG. 12 is a flowchart illustrating calibration processing.

Next, FIG. 12 is a flowchart describing the calibration processing performed in step S16 of FIG. 10.

In step S41, the calibration processing unit 35 acquires the stereo image and the radar image via the object detection processing unit 36.

In step S42, on the basis of the vehicle position and the traveling direction of the vehicle 21, the calibration processing unit 35 reads out and acquires the arrangement information of the targets 22 estimated to be detected by the stereo image and the radar image from the map data stored in the storage unit 32. On the map data, for example, the calibration processing unit 35 acquires the arrangement information of the targets 22 before the vehicle 21 in the radiation range of the millimeter wave.

In step S43, as described above with reference to FIG. 7, the calibration processing unit 35 performs the image recognition for the stereo image and thereby specifies distances up to the individually recognized targets 22 by using the distance image obtained using the parallax of the stereo image acquired in step S41.

In step S44, as described above with reference to FIG. 8, the calibration processing unit 35 performs the positioning between the arrangement information of the targets 22 acquired in step S42 and the targets 22 detected in the radar image acquired in step S41, and thereby specifies the targets 22 individually.

In step S45, the calibration processing unit 35 maps the targets 22 specified from the stereo image in step S43 and the targets 22 specified from the radar image in step S44 to the coordinate system in the real space. Then, the calibration processing unit 35 performs the calibration so as to eliminate the deviation between known positions of the targets 22 and positions of the targets 22 individually specified by the stereo image and the radar image. Afterward, the calibration processing unit 35 supplies the calibration result (the rotation and the translation of the coordinate system) to the object detection processing unit 36, and the object detection processing unit 36 performs setting so that the object is detected in accordance with the coordinate system to which the calibration is applied, and the calibration processing ends.

Here, the processing in which the calibration processing unit 35 detects a correspondence between the arrangement information of the targets 22 and the targets 22 detected in the radar image will be described. In addition, hereinafter, the arrangement information of the targets 22 is also referred to as advance arrangement information and, in the advance arrangement information, the positions of the targets 22 are specified in a world coordinate system.

<4. Detailed Description of Correspondence Detection Processing>

<First Correspondence Detection Processing>

First, the first correspondence detection processing using the advance arrangement information of the target, performed by the calibration processing unit 35 will be described in more detail.

Figure 13:
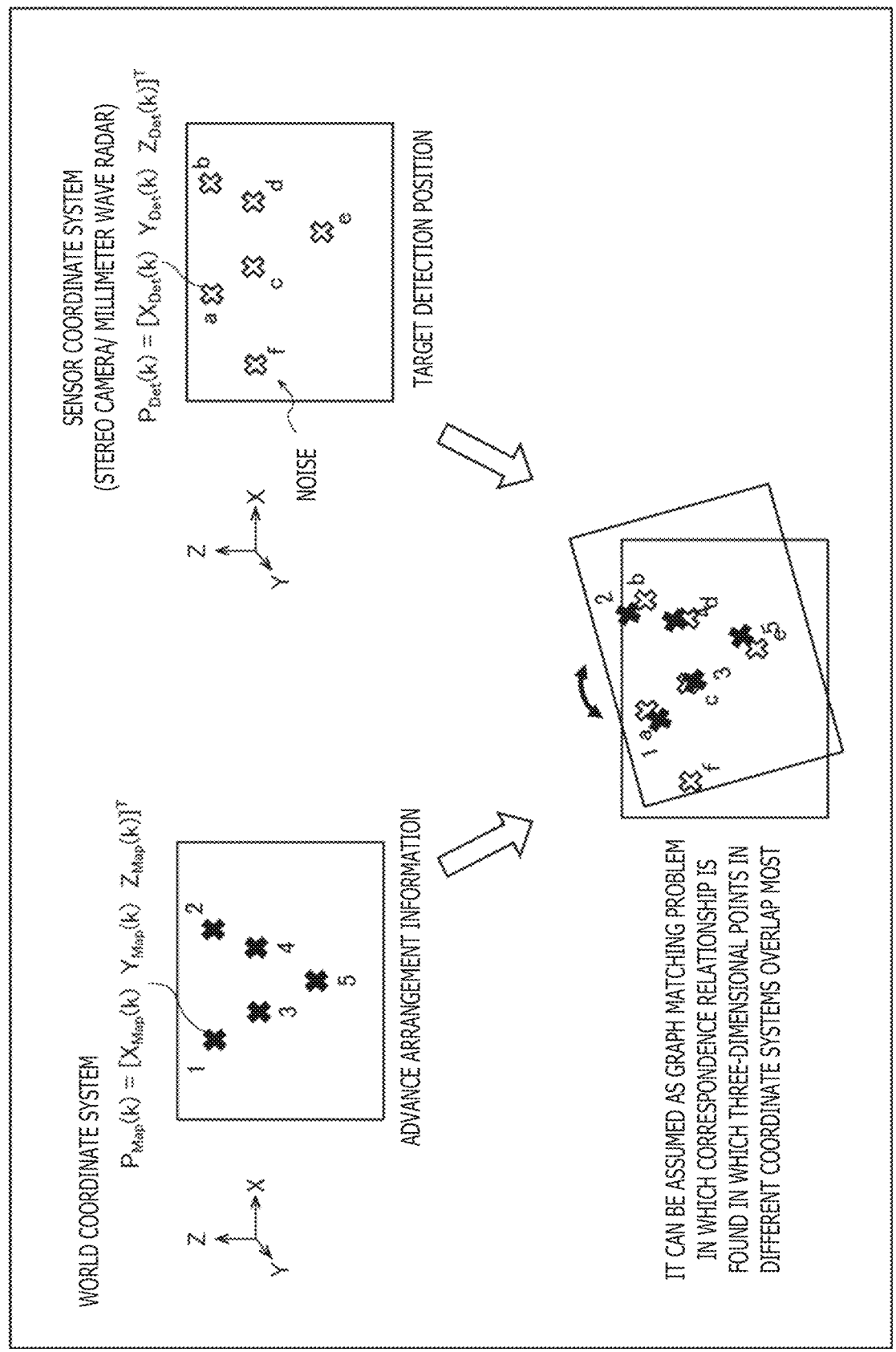
FIG. 13 is a diagram illustrating first correspondence detection processing.

As illustrated in FIG. 13, in the advance arrangement information of the targets, a position of a k-th target is assumed to be represented by $P_{MAP}(k)=[X_{MAP}(k)\ Y_{MAP}(k)\ Z_{MAP}(k)]^T$ in the world coordinate system in which a predetermined place is used as an origin, and to be represented by $P_{Det}(k)=[X_{Det}(k)\ Y_{Det}(k)\ Z_{Det}(k)]^T$ in a sensor coordinate system of the millimeter wave radar 12 or the stereo camera 13.

In addition, where the sensor coordinate system is a radar three-dimensional coordinate system, $Y_{Det}(k)$ is a fixed value. Also, the target is present in K pieces but, in the sensor coordinate system of the millimeter wave radar 12 or the stereo camera 13, K or more pieces of targets may be detected due to an influence of disturbance etc. In an example of FIG. 13, as compared with five targets in the advance arrangement information, a target position f is, for example, detected as the target due to noises in the sensor coordinate system and six targets of target detection positions a to f are detected.

In this way, the detection of the correspondence relationship between five target positions 1 to 5 in the world coordinate system and six target detection positions a to f in the sensor coordinate system can be solved assumed as a graph matching problem in which a correspondence relationship in which three-dimensional points in different coordinate systems overlap with each other best is found.

Figure 14:
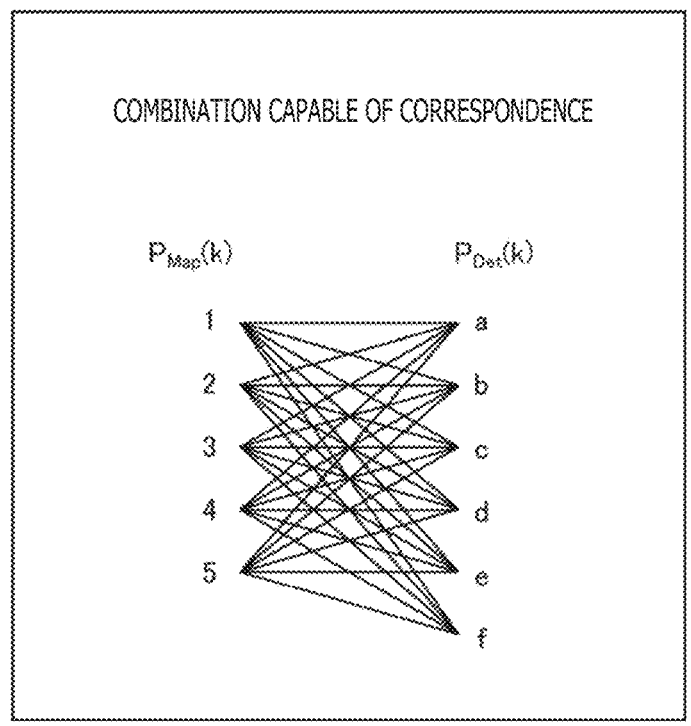
FIG. 14 is a diagram illustrating the first correspondence detection processing.

A combination capable of correspondence between the five target positions 1 to 5 in the world coordinate system and the six target detection positions a to f in the sensor coordinate system is possible for cases illustrated in FIG. 14.

When the correspondence relationship (connection) between the five target positions 1 to 5 in the world coordinate system and the six target detection positions a to f in the sensor coordinate system is represented by a matrix variable X of M-row N-column, the matrix variable X can be represented by the following formula (1).

[Math. 1]

$$X = \begin{bmatrix} x_{0,0} & \cdots & x_{0,N} \\ \vdots & \ddots & \vdots \\ x_{M,0} & \cdots & x_{M,N} \end{bmatrix} \quad (1)$$

$$x_{i,j} \in \{0, 1\}, \sum_{i}^{M} x_{i,j} = 1$$

In formula (1), M is the number (M=5 in the example of FIG. 13) of the targets in the world coordinate system and N is the number (N=6 in the example of FIG. 13) of the targets in the sensor coordinate system. Also, a suffix i of x represents a variable (0<i<M+1) for identifying the targets in the world coordinate system and a suffix j of x represents a variable (0<j<N+1) for identifying the targets in the sensor coordinate system. Also, $x_{i,j}$ represents the presence or absence of the connection between an i-th target in the world coordinate system and a j-th target in the sensor coordinate system, and is a variable that takes "1" when the connection is present and "0" when the connection is not present.

Figure 15:
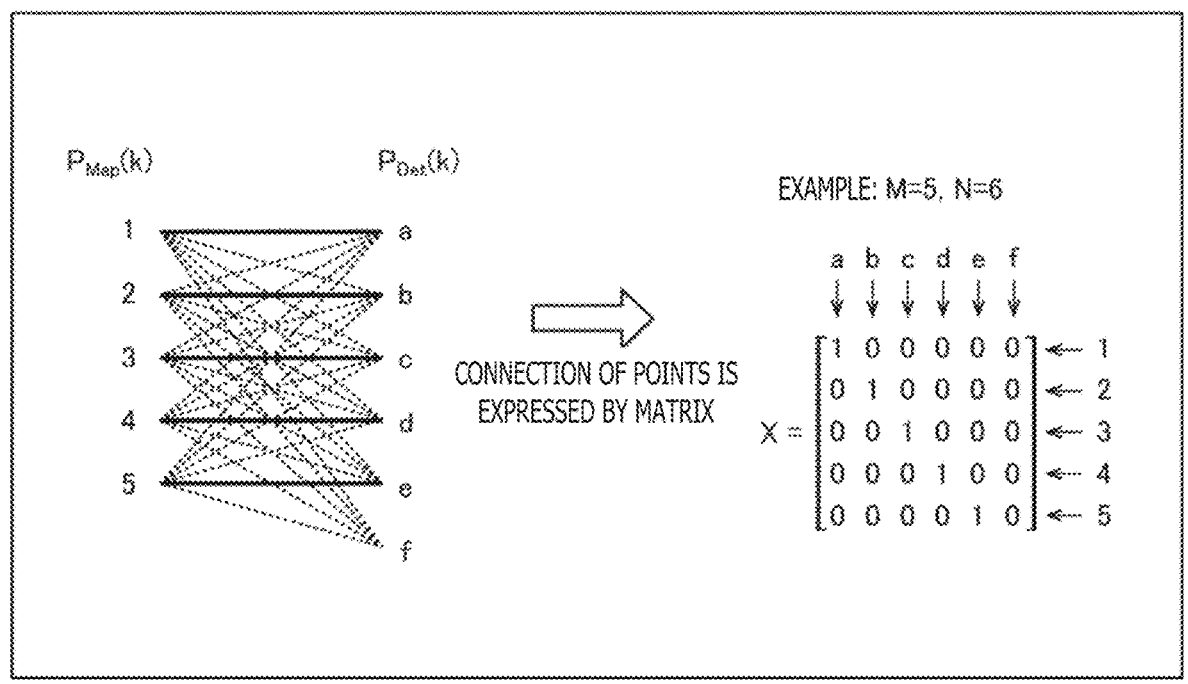
FIG. 15 is a diagram illustrating the first correspondence detection processing.

As illustrated by a thick solid line in FIG. 15, for example, in a case where a target position 1 in the world coordinate system and a target detection position a in the sensor coordinate system, a target position 2 in the world coordinate system and a target detection position b in the sensor coordinate system, a target position 3 in the world coordinate system and a target detection position c in the sensor coordinate system, a target position 4 in the world coordinate system and a target detection position d in the sensor coordinate system, and a target position 5 in the world coordinate system and a target detection position e in the sensor coordinate system correspond to each other, the matrix variable X representing the correspondence relationship is represented by the following formula (2).

[Math. 2]

$$X = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \end{bmatrix} \quad (2)$$

Then, the calibration processing unit 35 calculates X so that a score function score(X) using the matrix variable X represented by formula (2) is maximized. The score function score(X) is represented by the next formula (3).

[Math. 3]

$$\max \text{score}(X) = \sum_{i1,i2,j1,j2} S(l_{i1,i2}, h_{j1,j2}) x_{i1,j1} \, x_{i2,j2} \quad (3)$$

In formula (3), i1 and i2 are variables for identifying the targets in the world coordinate system and j1 and j2 are variables for identifying the targets in the sensor coordinate system. Also, $l_{i1,i2}$ represents a length of a segment connecting $P_{MAP}(i1)$ and $P_{MAP}(i2)$ in the world coordinate system and $h_{j1,j2}$ represents a length of a segment connecting $P_{Det}(j1)$ and $P_{Det}(j2)$ in the sensor coordinate system.

$S(l_{i1,i2}, h_{j1,j2})$ represents a degree of similarity between the length $l_{i1,i2}$ of the segment and the length $h_{j1,j2}$ of the segment, and as a value of the length $l_{i1,i2}$ of the segment and a value of the length $h_{j1,j2}$ of the segment are nearer to each other, $S(l_{i1,i2}, h_{j1,j2})$ takes a larger value. As the degree of similarity $S(l_{i1,i2}, h_{j1,j2})$, for example, the next formula (4) can be adopted using a difference $d(l_{i1,i2}, h_{j1,j2})$ between the length $l_{i1,i2}$ of the segment and the length $h_{j1,j2}$ of the segment.

[Math. 4]

$$S(l_{i1,i2}, h_{j1,j2}) = 2^{-|d(l_{i1,i2}, h_{j1,j2})|} \quad (4)$$

Figure 16:
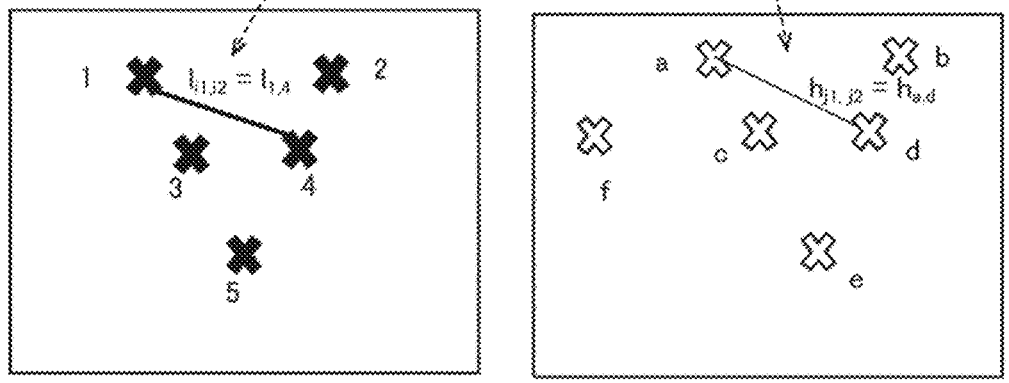
FIG. 16 is a diagram illustrating the first correspondence detection processing.

As illustrated in FIG. 16, for example, the score function score(X) calculated above is grounded in the idea that when a segment between the targets 1 and 4 in the world coordinate system corresponds to a segment between the targets a and d in the sensor coordinate system, both of the lengths $l_{1,4}$ and $l_{a,d}$ of the segments are approximately equivalent to each other and a difference $d(l_{i1,i2}, h_{j1,j2}) = d(l_{1,4}, h_{a,d})$ is smaller.

<Second Correspondence Detection Processing>

The above-mentioned first correspondence detection processing is a detection method using the advance arrangement information of the targets, and also enables the correspondence relationship between the target detected in the radar three-dimensional coordinate system and the target detected in a camera three-dimensional coordinate system to be detected without using the advance arrangement information of the targets.

Figure 17:
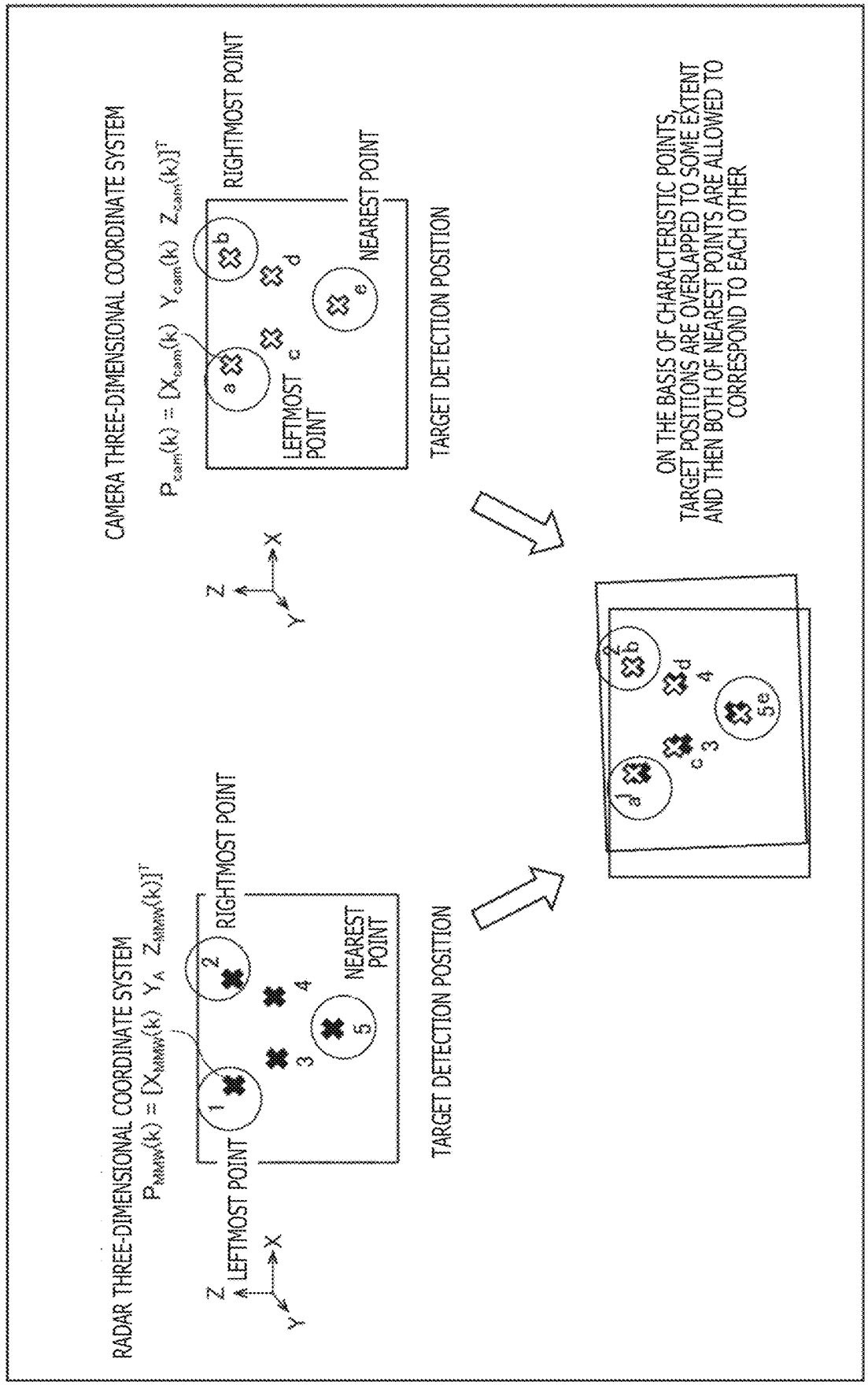
FIG. 17 is a diagram illustrating second correspondence detection processing.

As illustrated in FIG. 17, for example, the calibration processing unit 35 slides at least one of a target position $P_{MMW}(k)$ in the radar three-dimensional coordinate system and a target position $P_{cam}(k)$ in the camera three-dimensional coordinate system by a predetermined amount to thereby be overlapped and allow both the targets arranged nearest to correspond to each other.

<5. Detailed Description of Calculation of Positional Relationship>

The calibration processing unit 35 calculates the positional relationship between the millimeter wave radar 12 and the stereo camera 13 by using a plurality of targets in which the correspondence relationship is specified as described above.

Figure 18:
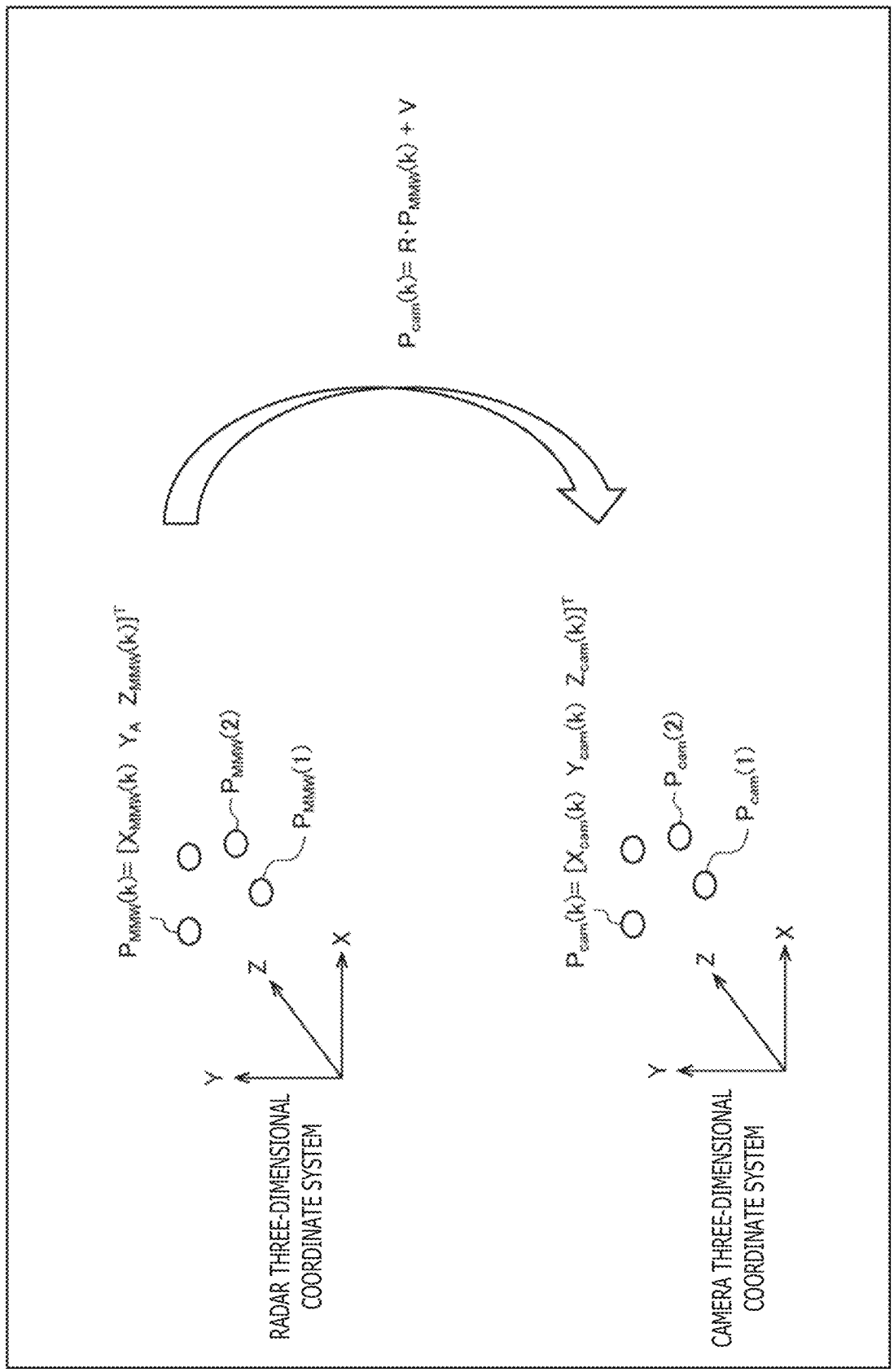
FIG. 18 is a diagram illustrating calculation of the positional relationship.

As illustrated in FIG. 18, specifically, among K pieces of targets in which the correspondence relationship is specified, a position of the k-th (0<k<K+1) target is represented by $P_{MMW}(k) = [X_{MMW}(k) \, Y_A \, Z_{MMW}(k)]^T$ in the radar three-dimensional coordinate system and is represented by $P_{cam}(k) = [X_{cam}(k) \, Y_{cam}(k) \, Z_{cam}(k)]T$ in the camera three-dimensional coordinate system. Here, T represents a transposition and $Y_A$ represents a predetermined fixed value.

With relation to each of the K pieces of targets, the calibration processing unit 35 substitutes the target position $P_{MMW}(k)$ and the target position $P_{cam}(k)$ in formula (5) representing the positional relationship between the target position $P_{MMW}(k)$ in the radar three-dimensional coordinate system and the target position $P_{cam}(k)$ in the camera three-dimensional coordinate system and solves an optimization problem by a least-square method etc. to thereby calculate a rotation matrix R and a translation vector V of formula (5).

[Math. 5]

$$P_{cam}(k) = R \cdot P_{MMW}(k) + V \quad (5)$$

In formula (5), k is a variable (0<k<K+1) for identifying a predetermined one of the plurality of (K pieces of) targets, and $P_{cam}(k)$ represents the target detection position of the k-th target detected in the camera three-dimensional coordinate system and $P_{MMW}(k)$ represents the target detection position of the k-th target detected in the radar three-dimensional coordinate system.

Formula (5) corresponds to formula for transforming the target detection position $P_{MMW}(k)$ of the k-th target detected in the radar three-dimensional coordinate system into the target detection position $P_{cam}(k)$ of the k-th target detected in the camera three-dimensional coordinate system. The rotation matrix R represents an attitude of the millimeter wave radar 12 on the basis of the stereo camera 13 and the translation vector V represents a position of the millimeter wave radar 12 on the basis of the stereo camera 13.

Since a variable of the rotation matrix R is present in three pieces and a variable of the translation vector V is present in three pieces, when at least six target detection positions can be acquired, the rotation matrix R and the translation vector V of formula (5) can be calculated. In addition, the rotation matrix R can be represented and solved by a quaternion in addition to the usage of the least-square method.

In accordance with the positional relationship between the millimeter wave radar 12 and the stereo camera 13 calculated in this way, specifically, in accordance with the rotation matrix R and the translation vector V of formula (5), the positional relationship between the millimeter wave radar 12 and the stereo camera 13 is calculated.

In addition, in the present embodiment, the communication apparatus 15 may adopt, for example, a communication method other than a Wi-Fi, such as communication using visible light or communication using the millimeter wave output from the millimeter wave radar 12. In addition to a reference of the map data stored in the storage unit 32, the signal processing apparatus 16 may always refer to an updated map data through a network by communication via the communication apparatus 15.

Also, as illustrated in FIG. 3, a case in which the millimeter wave radar 12 and the stereo camera 13 are mounted so as to face toward the front of the vehicle 21 in the detection direction, and detects objects in the front of the vehicle 21 is described; however, the detection direction of the objects is not limited to the front of the vehicle 21. For example, where the millimeter wave radar 12 and the stereo camera 13 are mounted so as to face toward the rear of the vehicle 21, the on-vehicle sensor 11 detects objects in the rear of the vehicle.

Further, in the above-mentioned example, an example in which the on-vehicle sensor 11 is mounted on the vehicle is described; further, in the present technology, in addition to the vehicle, for example, it is possible to mount the on-vehicle sensor 11 on other moving objects that move around lands, such as a robot.

<6. Computer Configuration Example>

A series of processing including the above-mentioned calibration processing can also be performed by hardware or can also be performed by software. In a case where the series of processing is performed by software, a program constituting the software is installed in a computer. Here, in the computer, a computer that is incorporated in dedicated hardware or a computer that is capable of performing various functions when various programs are installed, such as a general-purpose personal computer, is included.

Figure 19:
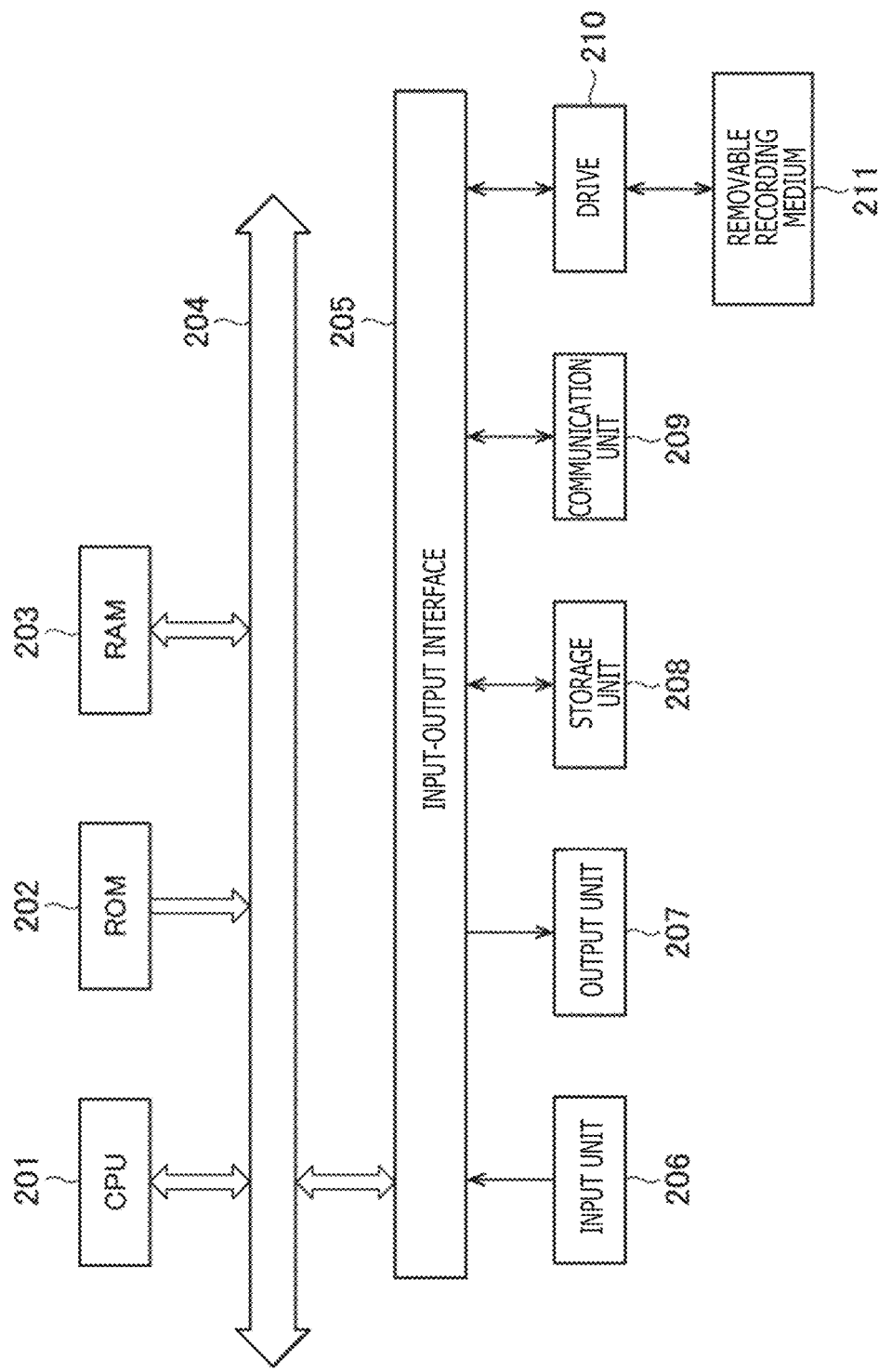
FIG. 19 is a block diagram illustrating a configuration example of an embodiment of a computer to which the present technology is applied.

FIG. 19 is a block diagram illustrating a configuration example of hardware of a computer that performs the above-mentioned series of processing by programs.

In the computer, a CPU (Central Processing Unit) 201, a ROM (Read Only Memory) 202, and a RAM (Random Access Memory) 203 are connected to each other via a bus 204.

An input-output interface 205 is further connected to the bus 204. An input unit 206, an output unit 207, a storage unit 208, a communication unit 209, and a drive 210 are connected to the input-output interface 205.

The input unit 206 includes a keyboard, a mouse, a microphone, and the like. The output unit 207 includes a display, a speaker, and the like. The storage unit 208 includes a hard disk, a nonvolatile memory, and the like. The communication unit 209 includes a network interface and the like. The drive 210 drives a removable recording medium 211 such as a magnetic disk, an optical disk, a magnetic optical disk, or a semiconductor memory.

In the computer configured as described above, for example, the CPU 201 loads a program stored in the storage unit 208 into the RAM 203 via the input-output interface 205 and the bus 204, and executes the program to thereby perform the above-mentioned series of processing.

In the computer, the removable recording medium 211 is loaded into the drive 210 to thereby install the program in the storage unit 208 via the input-output interface 205. Also, a program can be received by the communication unit 209 via a wired or wireless transmission medium, such as a local area network, the Internet, or digital satellite broadcasting and be installed into the storage unit 208. In addition, a program can be installed in advance in the ROM 202 or the storage unit 208.

Note that the program executed by the computer may be a program in which processing is performed in a time series in the order described in the present specification or may be a program in which the processing is performed in parallel or at necessary timing, such as when the processing is called.

The step described in a flowchart may be, of course, performed in a time series in the order described and, even if processing is not necessarily performed in a time series, the processing may be performed in parallel or at necessary timing, such as when the processing is called.

In the present specification, a system means a set of a plurality of components (such as an apparatus or a module (part)), and does not take into account whether or not all the components are present in the same casing. Therefore, the system may be any of a plurality of apparatuses stored in separate casings and connected through a network, and a single apparatus in which a plurality of modules are stored in a single casing.

Embodiment of the present technology is not limited to the embodiments described above, and various changes can be made without departing from the spirit of the present technology.

For example, an embodiment in which all or a part of a plurality of embodiments described above are combined can be adopted.

For example, the present technology can employ cloud computing configuration in which a single function is jointly processed while being shared by a plurality of apparatuses via a network.

Moreover, each of the steps described in the above-mentioned flowchart can be performed by a single apparatus or can be performed while being shared by a plurality of apparatuses.

Further, where a plurality of pieces of processing are included in a single step, the plurality of pieces of processing included in the single step can be performed by a single apparatus or can be performed while being shared by a plurality of apparatuses.

Incidentally, the advantageous effects described in the present specification are strictly illustrative and are not limited thereto, and there may be advantageous effects other than those described in the present specification.

In addition, the present technology may also take the following configurations.

(1)

A signal processing apparatus including:

a reliability determination unit configured to determine, by communication with a target of which positional information is known, whether or not the target is reliable; and a calibration processing unit configured to perform calibration processing for eliminating a deviation in coordinate systems generated in a stereo image and a radar image in which the target is detected in a case where it is determined by the reliability determination unit that the target is reliable.

(2)

The signal processing apparatus according to (1) above, further including:

a vehicle position specification unit configured to specify a current position of a vehicle on which the signal processing apparatus is mounted; and a target location area determination unit configured to refer to map data on which arrangement positions of a plurality of the targets are registered and, in a case where the current position of the vehicle is present in a location area of the target, cause the reliability determination unit to perform determination.

(3)
The signal processing apparatus according to (1) or (2) above, in which
the calibration processing unit
performs image recognition for the stereo image and thereby individually recognizes the target projected on the stereo image, and
specifies a distance of the target individually recognized by using a distance image obtained using a parallax of the stereo image.

(4)
The signal processing apparatus according to any one of (1) to (3) above, in which
the calibration processing unit performs positioning between the known positional information of the target and the target detected in the radar image, and thereby individually recognizes the target detected in the radar image.

(5)
The signal processing apparatus according to any one of (1) to (4) above, in which
the calibration processing unit maps each of the targets recognized by the stereo image and the radar image to a coordinate system in a real space based on the known positional information of the target and performs calibration by rotating or translating each of the coordinate systems of the stereo image and the radar image so that a deviation from a known position of the target is minimized.

(6)
The signal processing apparatus according to any one of (1) to (5) above, in which
the reliability determination unit requests a digital signature from the target and determines reliability of the target by using the digital signature transmitted from the target.

(7)
A signal processing method including the steps of:
determining, by communication with a target of which positional information is known, whether or not the target is reliable; and
performing calibration processing for eliminating a deviation in coordinate systems generated in a stereo image and a radar image in which the target is detected in a case where it is determined that the target is reliable.

(8)
A program for causing a computer to perform signal processing including the steps of:
determining, by communication with a target of which positional information is known, whether or not the target is reliable; and
performing calibration processing for eliminating a deviation in coordinate systems generated in a stereo image and a radar image in which the target is detected in a case where it is determined that the target is reliable.

(9)
An object detection system including:
a stereo image imaging apparatus configured to acquire a stereo image by performing imaging by a plurality of imaging units;
a radar apparatus configured to acquire, by using a radio wave of a predetermined wavelength region, a radar image in which a position of an object in a radiation range of the radio wave is detected;

a communication apparatus configured to perform communication with a target of which positional information is known; and
a signal processing apparatus having a reliability determination unit configured to determine, by communication with the target via the communication apparatus, whether or not the target is reliable, and a calibration processing unit configured to perform calibration processing for eliminating a deviation in coordinate systems generated in the stereo image and the radar image in which the target is detected in a case where it is determined by the reliability determination unit that the target is reliable.

REFERENCE SIGNS LIST

11 On-vehicle sensor, 12 Millimeter wave radar, 13 Stereo camera, 13R Right camera, 13L Left camera, 14 Position measuring apparatus, 15 Communication apparatus, 16 Signal processing apparatus, 21 Vehicle, 22 Target, 31 Vehicle position specification unit, 32 Storage unit, 33 Target location area determination unit, 34 Reliability determination unit, 35 Calibration processing unit, 36 Object detection processing unit

The invention claimed is:

1. A signal processing apparatus comprising:
a processor configured to:
receive a digital signature from a target, wherein the digital signature comprises determined data and encrypted data;
determine a reliability of the target based on a comparison between a hash value of the determined data and a value obtained by decryption of the encrypted data; and
eliminate, based on the determined reliability of the target, a deviation in coordinate systems of a stereo image and a radar image in which the target is detected.

2. The signal processing apparatus according to claim 1, wherein the processor is further configured to:
specify a current position of a vehicle on which the signal processing apparatus is mounted; and
refer to map data on which arrangement positions of a plurality of targets are registered; and
control the determination of the reliability of the target based on the current position of the vehicle that is present in a location area of the target.

3. The signal processing apparatus according to claim 1, wherein the processor is further configured to:
execute image recognition of the stereo image to recognize the target projected on the stereo image; and
determine a distance of the recognized target from a vehicle based on a distance image obtained by a parallax of the stereo image, wherein the signal processing apparatus is mounted on the vehicle.

4. The signal processing apparatus according to claim 1, wherein the processor is further configured to execute a positioning process between stored positional information of the target and the target detected in the radar image to recognize the target detected in the radar image.

5. The signal processing apparatus according to claim 1, wherein the processor is further configured to:
map each of a plurality of targets recognized by the stereo image and the radar image to a coordinate system in a real space based on stored positional information of the target; and
execute calibration by at least one of rotation or translation of each of the coordinate systems of the stereo image and the radar image to minimize the deviation from a stored position of the target.

6. The signal processing apparatus according to claim 1, wherein the processor is further configured to request the digital signature from the target.

7. A signal processing method, comprising:
receiving a digital signature from a target, wherein the digital signature comprises determined data and encrypted data;
determining a reliability of the target based on a comparison between a hash value of the determined data and a value obtained by decryption of the encrypted data; and
eliminating, based on the reliability of the target, a deviation in coordinate systems of a stereo image and a radar image in which the target is detected.

8. A non-transitory computer-readable medium having stored thereon, computer-executable instructions which, when executed by a processor, cause the processor to execute operations, the operations comprising:
receiving a digital signature from a target, wherein the digital signature comprises determined data and encrypted data;
determining a reliability of the target based on a comparison between a hash value of the determined data and a value obtained by decryption of the encrypted data; and
eliminating, based on the reliability of the target, a deviation in coordinate systems of a stereo image and a radar image in which the target is detected.

9. An object detection system, comprising:
a stereo imaging apparatus configured to acquire a stereo image;
a radar apparatus configured to acquire, by a radio wave of a determined wavelength region, a radar image in which a position of an object in a radiation range of the radio wave is detected;
a communication apparatus configured to communicate with a target; and
a signal processing apparatus configured to:
receive a digital signature from the target, wherein the digital signature comprises determined data and encrypted data;
determine a reliability of the target based on a comparison between a hash value of the determined data and a value obtained by decryption of the encrypted data; and
eliminate, based on the determined reliability of the target, a deviation in coordinate systems of the stereo image and the radar image in which the target is detected.

10. The signal processing apparatus according to claim 1, wherein the processor is further configured to:
determine the hash value of the determined data; and
decrypt the encrypted data to obtain the value for the comparison with the determined hash value of the determined data.

* * * * *